(12) United States Patent
Lee et al.

(10) Patent No.: US 12,543,000 B2
(45) Date of Patent: Feb. 3, 2026

(54) WEARABLE DEVICE FOR PROVIDING MULTI-MODALITY AND OPERATION METHOD THEREOF

(71) Applicant: SAMSUNG ELECTRONICS CO., LTD., Suwon-si (KR)

(72) Inventors: Dongseop Lee, Suwon-si (KR); Hakjung Kim, Suwon-si (KR); Daniel Dongyuel Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 236 days.

(21) Appl. No.: 18/126,862

(22) Filed: Mar. 27, 2023

(65) Prior Publication Data

US 2023/0239618 A1    Jul. 27, 2023

Related U.S. Application Data

(63) Continuation of application No. PCT/KR2022/015862, filed on Oct. 18, 2022.

(30) Foreign Application Priority Data

Oct. 19, 2021  (KR) .................. 10-2021-0139739
Sep. 15, 2022  (KR) .................. 10-2022-0116642

(51) Int. Cl.
*H04R 3/04*     (2006.01)
*G06F 3/01*     (2006.01)
(Continued)

(52) U.S. Cl.
CPC ............... *H04R 3/04* (2013.01); *G06F 3/016* (2013.01); *G10L 25/06* (2013.01); *G10L 25/21* (2013.01); *G10L 25/30* (2013.01)

(58) Field of Classification Search
CPC ....... H04R 3/04; H04R 1/028; H04R 2400/03; H04R 1/02; G06F 3/016; G06F 1/163;
(Continued)

(56) References Cited

U.S. PATENT DOCUMENTS 7,218,310 B2   5/2007   Tierling et al.
8,749,362 B2   6/2014   Lee et al.
(Continued)

FOREIGN PATENT DOCUMENTS

CN   112464814 A    3/2021
EP   0 784 844 B1   6/2005
(Continued)

OTHER PUBLICATIONS

Multimodal Co-learning: Challenges, Applications with Datasets, Recent Advances and Future Directions [online]. Anil Rahate et al. [archived on web.archive.org on Jul. 30, 2021]. Retrieved from the internet. <URL: https://web.archive.org/web/20210730062324/https://arxiv.org/abs/2107.13782> (Year: 2021).*

(Continued)

*Primary Examiner* — Fan S Tsang
*Assistant Examiner* — Sean M Rinehart
(74) *Attorney, Agent, or Firm* — Sughrue Mion, PLLC

(57) ABSTRACT

Provided are a wearable device for providing a multi-modality, and an operation method of the wearable device. The operation method of the wearable device including obtaining source data including at least one of image data, text data, or sound data, determining whether the image data, the text data, and the sound data are included in the source data, based on determining that at least one of the image data, the text data, or the sound data is not included in the source data, generating the image data, the text data, and the sound data, which are not included in the source data, by using a generator of an generative adversarial network (Continued)

(GAN), which receives the source data as an input, generating a pulse-width modulation (PWM) signal based on the sound data, and outputting the multi-modality based on the image data, the text data, the sound data, and the PWM signal.

18 Claims, 23 Drawing Sheets

(51) Int. Cl.
*G10L 25/06* (2013.01)
*G10L 25/21* (2013.01)
*G10L 25/30* (2013.01)

(58) Field of Classification Search
CPC .......... G06F 3/04815; G06F 3/16; G06F 3/01; G06F 1/16; G10L 25/06; G10L 25/21; G10L 25/30; G10L 13/033; G10L 25/51; G10L 15/16; G10L 16/183; G10L 15/00; G10L 25/18; G06N 3/02; G06N 20/00; G06T 7/00; G06V 30/40; A43B 3/00; A61B 5/00; A61B 5/332; G06K 9/62; G06K 9/00; A63F 2300/10; A63F 13/28; H04B 1/40
USPC .......................................................... 700/94
See application file for complete search history.

(56) References Cited

U.S. PATENT DOCUMENTS

| | | | |
|---|---|---|---|
| 10,181,331 | B2 | 1/2019 | Eagleman et al. |
| 10,606,358 | B2 | 3/2020 | Cruz Hernandez et al. |
| 10,966,007 | B1* | 3/2021 | Fenner ................ H04R 1/1016 |
| 11,437,034 | B2 | 9/2022 | Lee |
| 2009/0058860 | A1 | 3/2009 | Fong et al. |
| 2010/0333037 | A1* | 12/2010 | Pavlovski ............. G06F 3/0481 715/848 |
| 2013/0088342 | A1 | 4/2013 | Ahn et al. |
| 2013/0337796 | A1* | 12/2013 | Suhami .................. H04R 25/00 381/103 |
| 2014/0292501 | A1 | 10/2014 | Lim et al. |
| 2018/0096632 | A1 | 4/2018 | Florez et al. |
| 2019/0045296 | A1* | 2/2019 | Ralph .................. H04R 1/2807 |
| 2021/0151034 | A1 | 5/2021 | Hasan et al. |
| 2021/0304072 | A1* | 9/2021 | Kalra ........................ G06N 7/01 |
| 2021/0390303 | A1* | 12/2021 | Neumann .............. G06V 20/10 |
| 2022/0027634 | A1 | 1/2022 | Wang et al. |
| 2022/0092276 | A1* | 3/2022 | Tu ........................... G06F 40/58 |
| 2022/0269867 | A1* | 8/2022 | Yang ....................... G06F 16/56 |
| 2022/0326769 | A1 | 10/2022 | Bae |
| 2023/0206121 | A1* | 6/2023 | Li ......................... G06V 10/806 706/12 |
| 2023/0290234 | A1* | 9/2023 | Wei .......................... G08B 6/00 |
| 2024/0004963 | A1* | 1/2024 | Nouri ...................... G06F 18/10 |
| 2024/0144337 | A1* | 5/2024 | Fox ........................ G06N 3/047 |

FOREIGN PATENT DOCUMENTS

| | | |
|---|---|---|
| EP | 3382443 A1 | 10/2018 |
| JP | 5479816 B2 | 4/2014 |
| KR | 10-2011-0061437 A | 6/2011 |
| KR | 10-1666393 B1 | 10/2016 |
| KR | 10-2021-0058305 A | 5/2021 |
| KR | 10-2021-0062428 A | 5/2021 |
| KR | 10-2021-0081300 A | 7/2021 |
| WO | 2017 101523 A1 | 6/2017 |

OTHER PUBLICATIONS

Communication issued Sep. 24, 2024 by the European Patent Office in European Patent Application No. 22883979.1.
Rahate, Anil et al., "Multimodal Co-learning: Challenges, Applications with Datasets, Recent Advances and Future Directions", arxiv.org, Jul. 29, 2021, XP091018717. (75 pages total).
Swartz, J., "Why is 'metaverse' the hottest tech buzzword? Apple has something to do with it", 2021, markertwatch.com, 3 pages total, https://www.marketwatch.com/story/why-is-metaverse-the-hottest-techbuzzword-apple-has-something-to-do-with-it-11627998184.
Search Report & Written Opinion (PCT/ISA/220, PCT/ISA/210, PCT/ISA/237) issued Feb. 2, 2023 by the International Searching Authority for International Patent Application No. PCT/KR2022/015862.
Communication dated Jul. 28, 2025 issued by the Intellectual Property India in Indian Patent Application No. 202427027016.

\* cited by examiner

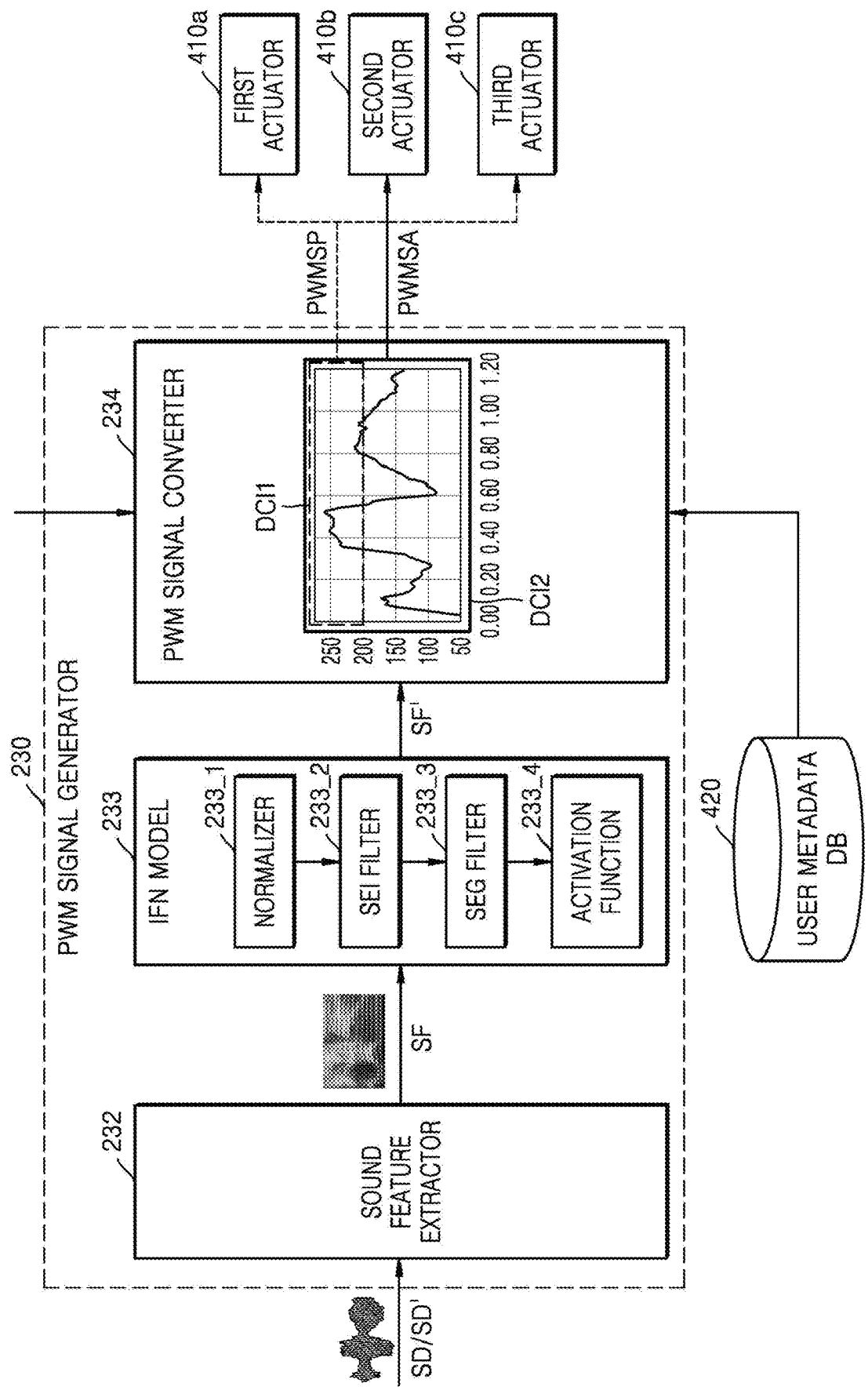

WEARABLE DEVICE FOR PROVIDING MULTI-MODALITY AND OPERATION METHOD THEREOF

CROSS-REFERENCE TO RELATED APPLICATIONS

This application is a continuation application of International Application No. PCT/KR2022/015862, filed on Oct. 18, 2022, which claims priority to Korean Patent Application No. 10-2021-0139739 filed on Oct. 19, 2021 and Korean Patent Application No. 10-2022-0116642 filed on Sep. 15, 2022 in the Korean Intellectual Property Office, the disclosures of which are herein incorporated by reference.

TECHNICAL FIELD

The disclosure relates to a wearable device and an operation method thereof. More particularly, the disclosure relates to a wearable device capable of generating, from source data, an image, a text, and a sound, which are not included in the source data, and generating, from the sound, a pulse-width modulation (PWM) signal corresponding to a tactile modality, and an operation method of the wearable device.

BACKGROUND

In the past, communication between users was achieved by using sounds, images, or texts, which may each be classified as mono-modality. Recently, the era of virtual reality-based metaverse is rapidly developing, and various types of wearable devices, such as smart watches, smart bands, smart clothing, or head-mounted displays, are being provided to users. These types of wearable devices may provide users with an enhanced experience by providing the users with multi-modality interactions while performing their operations.

Study on various modalities has been conducted to realize multi-sensory experiences (e.g., visual, aural, and tactile sensations) optimized for the era of metaverse. In particular, the tactile modality is attracting attention as core modality that gives users a sense of immersion in sound, image, and text. A tactile modality may be delivered, to a user equipped with a wearable device, as haptic feedback corresponding to sound, image, and text.

SUMMARY

A method of a wearable device for providing a multi-modality according to an embodiment of the disclosure may include obtaining source data including at least one of image data, text data, or sound data. The method of the wearable device may further include determining whether the image data, the text data, and the sound data are included in the source data. The method of the wearable device may further include, based on determining that at least one of the image data, the text data, or the sound data is not included in the source data, generating the image data, the text data, and the sound data, which are not included in the source data, by using a neural network, which receives the source data as input. The method of the wearable device may further include generating a pulse-width modulation (PWM) signal, based on the sound data. The method of the wearable device may further include outputting the multi-modality based on the image data, the text data, the sound data, and the PWM signal.

A wearable device for providing a multi-modality according to an embodiment of the disclosure may include a display. The wearable device may include a speaker. The wearable device may include at least one actuator. The wearable device may include a memory storing one or more instructions. The wearable device may include at least one processor configured to execute the one or more instructions stored in the memory. The at least one processor may be further configured to execute the one or more instructions to determine whether the image data, the text data, and the sound data are included in the source data. The at least one processor may be further configured to execute the one or more instructions to, based on determining that at least one of the image data, the text data, or the sound data is not included in the source data, generate the image data, the text data, and the sound data, which are not included in the source data, by using a neural network, which receives the source data as an input. The at least one processor may be further configured to execute the one or more instructions to generate a pulse-width modulation (PWM) signal, based on the sound data. The at least one processor may be further configured to execute the one or more instructions to control the display, the speaker, and the at least one actuator to output the multi-modality based on the image data, the text data, the sound data, and the PWM signal.

An embodiment of the disclosure provides a computer-readable recording medium having recorded thereon a program to be executed on a computer.

BRIEF DESCRIPTION OF DRAWINGS

FIGS. 4A and 4B are block diagrams illustrating in more detail a pulse-width modulation (PWM) signal generator of FIG. 2.

DETAILED DESCRIPTION

Figure 1:
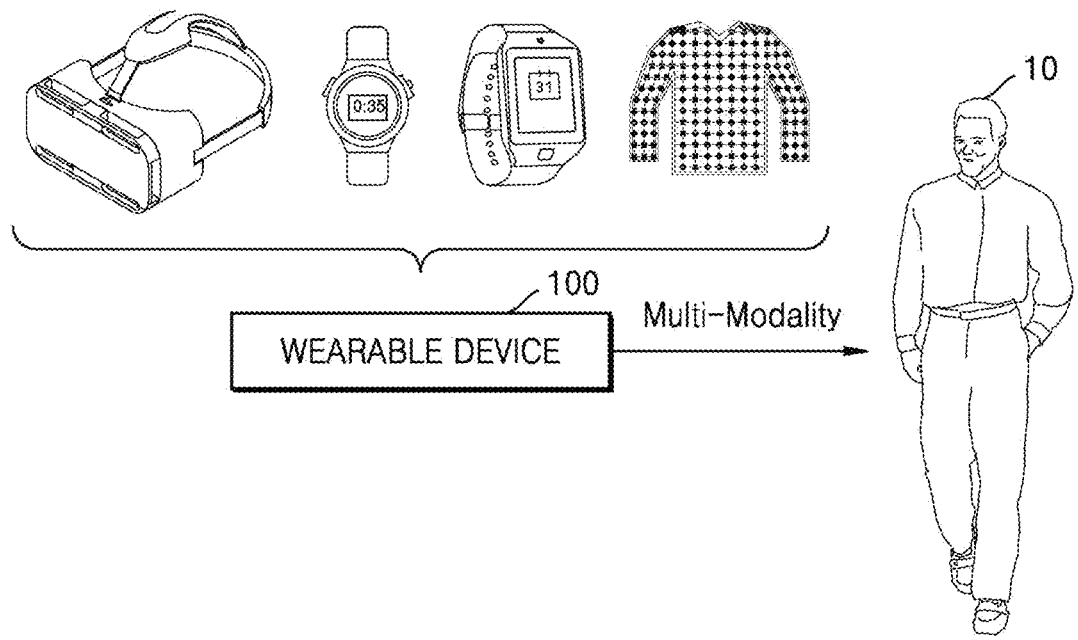
FIG. 1 is a conceptual diagram illustrating a wearable device for providing a multi-modality according to an embodiment of the disclosure.

Throughout the disclosure, the expression "at least one of a, b or c" indicates only a, only b, only c, both a and b, both a and c, both b and c, all of a, b, and c, or variations thereof.

The terms used herein will be briefly described, and then the disclosure will be described in detail.

Although the terms used herein are selected from among common terms that are currently widely used in consideration of their functions in the disclosure, the terms may be different according to an intention of one of ordinary skill in the art, a precedent, or the advent of new technology. Also, in particular cases, the terms are discretionally selected by the applicant of the disclosure, in which case, the meaning of those terms will be described in detail in the corresponding part of the detailed description. Therefore, the terms used herein are not merely designations of the terms, but the terms are defined based on the meaning of the terms and content throughout the disclosure.

The singular expression may also include the plural meaning as long as it is not inconsistent with the context. All the terms used herein, including technical and scientific terms, may have the same meanings as those generally understood by those of skill in the art. In addition, although the terms such as 'first' or 'second' may be used herein to describe various elements, these elements should not be limited by these terms. These terms are only used to distinguish one element from another element.

Throughout the specification, when a part "includes" a component, it means that the part may additionally include other components rather than excluding other components as long as there is no particular opposing recitation. Also, the terms described in the specification, such as " . . . er (or)", " . . . unit", " . . . module", etc., denote a unit that performs at least one function or operation, which may be implemented as hardware or software or a combination thereof.

Hereinafter, embodiments of the disclosure will be described in detail with reference to the accompanying drawings for one of skill in the art to be able to perform the disclosure without any difficulty. The disclosure may, however, be embodied in many different forms and should not be construed as being limited to the embodiments of the disclosure set forth herein. In order to clearly describe the disclosure, portions that are not relevant to the description of the disclosure are omitted, and similar reference numerals are assigned to similar elements throughout the present specification.

As used herein, the term "user" refers to a person who controls systems, functions, or operations, and may include a developer, an administrator, or an installer.

As used herein, the term "modality" may refer to a sensory channel (e.g., a visual channel, an auditory channel, a tactile channel) for interaction with a user wearing a wearable device, or a signal, information, or data being input or output through the sensory channel. For example, an auditory modality may refer to a sound signal output through the auditory channel (e.g., a speaker), a visual modality may refer to text, image, or video data output through the visual channel (e.g., a display), and a tactile modality may refer to a vibration signal output through the tactile channel (e.g., an actuator).

As used herein, "multi-channel" may include channels separated by a frequency domain. For example, each of a plurality of filters separating a sound signal into a specific frequency domain may correspond to a channel of the multi-channels. Accordingly, PWM signals corresponding to each of the filtered signals may be delivered to the actuator via a separate channel. In one embodiment, one channel may correspond to one actuator.

As used herein, a "neural network" is a representative example of an artificial neural network model that simulates brain nerves, and is not limited to an artificial neural network model using a particular algorithm.

FIG. 1 is a conceptual diagram illustrating a wearable device 100 for providing a multi-modality according to an embodiment of the disclosure. Referring to FIG. 1, the wearable device 100 may provide a multi-modality to a user 10.

For example, the wearable device 100 may include at least one of a head-mounted display, a smart watch, a smart band, smart clothing, or the like, but the disclosure is not limited thereto, and the wearable device 100 may include any device that is wearable by or interactable with the user 10. For example, the multi-modality may include a visual modality, an auditory modality, and a tactile modality, but the disclosure is not limited thereto, and the multi-modality may further include any modality (e.g., sense of smell or taste) for interacting with various sensory organs of the user 10. For convenience of description, it is assumed hereinafter that the multi-modality provided by the wearable device 100 includes a visual modality, an auditory modality, and a tactile modality.

In an embodiment of the disclosure, the wearable device 100 may obtain modality source data (may also be referred to as source data). For example, the modality source data may be multimedia data (e.g., image data, text data, sound data, graphic data, video data, etc.). As used herein, it is assumed that the modality source data includes at least one of image data, text data, and sound data. However, the present disclosure is not limited to this, and the modality source data may include at least one of different types of data included in the multimedia data.

The image data, the text data, and the sound data may correspond to each other. For example, the image data may include image information about a laughing person, the text data may include text information of "LOL", and the sound data may include information about a human laughing sound.

In an embodiment of the disclosure, in a case in which at least one of image data, text data, or sound data is not included in the modality source data, the wearable device 100 may generate image data, text data, and/or sound data based on the obtained modality source data. For example, in a case in which image data is included in the modality source data, the wearable device 100 may generate text data and sound data based on the image data. For example, in a case in which text data is included in the modality source data, the wearable device 100 may generate image data and sound data based on the text data. For example, in a case in which sound data is included in the modality source data, the wearable device 100 may generate image data and text data based on the sound data. For example, in a case in which image data and text data are included in the modality source data, the wearable device 100 may generate sound data based on at least one of the image data or the text data. For example, in a case in which image data and sound data are included in the modality source data, the wearable device 100 may generate text data based on at least one of the image data or the sound data. For example, in a case in which sound data and text data are included in the modality source data, the wearable device 100 may generate image data based on at least one of the sound data or the text data.

In an embodiment of the disclosure, the wearable device 100 may generate image data, text data, and sound data, which are not included in the modality source data, by using a neural network (e.g., a generative model such as a generator of a generative adversarial network (GAN)) that uses modality source data as an input. An example of a method of training a generator of the GAN is described in detail below with reference to FIG. 3.

In an embodiment of the disclosure, the neural network may comprise a plurality of neural networks (the first to twelfth neural networks). The plurality of neural networks (the first to twelfth neural networks) may generate multimedia data (e.g., image data, text data, and sound data) included in the modality source data by using the multimedia data (e.g., image data, text data, and sound data) included in the modality source data as input.

For example, the first neural network may generate text data by using image data as an input. For example, the second neural network may generate sound data by using image data as an input. For example, the third neural network may generate image data by using text data as an input. For example, the fourth neural network may generate sound data by using text data as an input. For example, the fifth neural network may generate image data by using sound data as an input. For example, the sixth neural network may generate text data by using sound data as an input. For example, the seventh neural network may generate sound data by using image data and text data as inputs. For example, the eighth neural network may generate text data using image data and sound data as inputs. For example, the ninth neural network may generate image data by using text data and sound data as inputs. For example, the tenth neural network may generate text data and sound data by using image data as an input. For example, the eleventh neural network may generate image data and sound data by using text data as an input. For example, the twelfth neural network may generate image data and text data by using sound data as an input.

In an embodiment of the disclosure, the wearable device 100 may identify a neural network having at least one of image data, text data, and sound data included in modality source data as an input, among a plurality of neural networks. The wearable device 100 may generate image data, text data, and sound data not included in the modality source data by using the identified neural network.

In an embodiment of the disclosure, the wearable device 100 may generate a pulse-width modulation (PWM) signal based on sound data. For example, the wearable device 100 may calculate (or extract) a sound feature based on sound data. The wearable device 100 may generate a PWM signal by modulating the pulse width of the sound feature. The wearable device 100 may output a tactile modality by controlling an actuator based on the PWM signal. Accordingly, haptic feedback by the tactile modality may be delivered to the user.

In an embodiment of the disclosure, the wearable device 100 may generate pieces of sub-sound data by filtering the sound data with a frequency. Based on the pieces of sub-sound data, the wearable device 100 may generate PWM signals respectively corresponding to the pieces of sub-sound data. The PWM signals respectively corresponding to the pieces of sub-sound data may be transmitted to their corresponding actuators.

In an embodiment of the disclosure, the wearable device 100 may generate a PWM signal by using an integrate-and-fire neuron (IFN) model that uses sound data as an input. An example of a method of using an IFN model is described in detail below with reference to FIGS. 4A and 4B.

In an embodiment of the disclosure, the wearable device 100 may generate a PWM signal that provides a haptic illusion effect to a user based on sound data. A method of generating a PWM signal providing a haptic illusion effect is described in detail with reference to FIGS. 13A and 13B.

In an embodiment of the disclosure, the wearable device 100 may adjust the PWM signal based on a user input. The extent to which the user 10 perceives the haptic feedback may vary. The wearable device 100 may receive a user input corresponding to the intensity of the haptic feedback. The wearable device 100 may adjust the PWM signal such that the intensity of the haptic feedback is set to correspond to the user input.

In an embodiment of the disclosure, the wearable device 100 may adjust the PWM signal based on user metadata. The user metadata may include user profile information indicating the user's characteristics (e.g., voice, age, gender, height, weight, etc.). For example, the wearable device 100 may adjust the PWM signal such that the intensity of the haptic feedback is set to reflect the user's characteristics. An example of a method of reflecting a user's voice characteristics is described in detail below with reference to FIGS. 7A to 7C.

In an embodiment of the disclosure, the wearable device 100 may output a visual modality based on image data and text data. For example, the wearable device 100 may output the visual modality by controlling a display included in the wearable device 100. For example, the wearable device 100 may transmit the image data to an external device and control the external device to output the visual modality.

In an embodiment of the disclosure, the wearable device 100 may output an auditory modality based on sound data. For example, the wearable device 100 may output the auditory modality by controlling a speaker included in the wearable device 100. For example, the wearable device 100 may transmit sound data to an external device and control the external device to output the auditory modality.

In an embodiment of the disclosure, the wearable device 100 may simultaneously output a multi-modality including a visual modality, an auditory modality, and a tactile modality.

Figure 2:
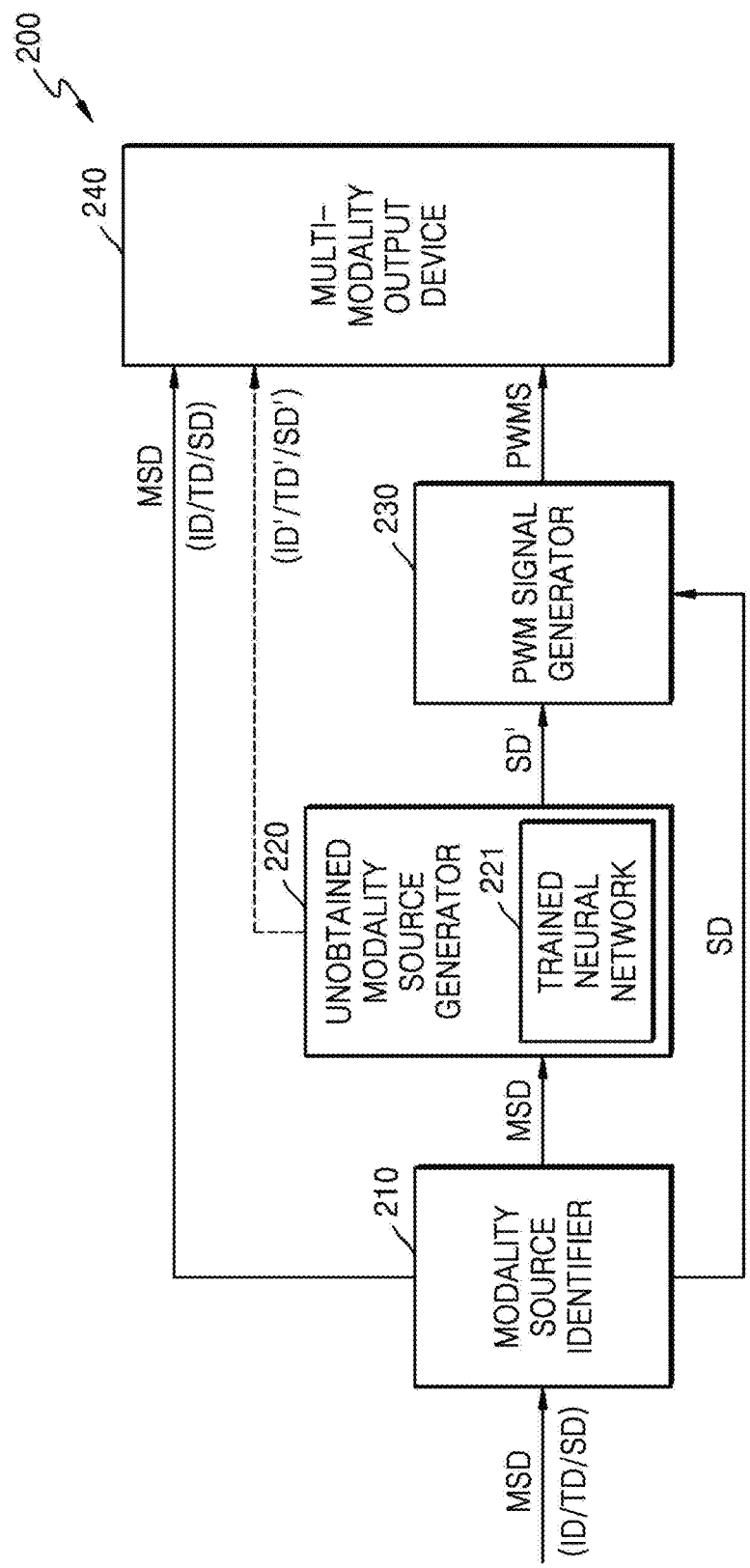
FIG. 2 is a block diagram for describing operations of a wearable device according to an embodiment of the disclosure.

FIG. 2 is a block diagram for describing operations of a wearable device 200 according to an embodiment of the disclosure. The function, configuration, and operation of the wearable device 100 described with reference to FIG. 1 are similar to those of the wearable device 200, and thus, redundant descriptions thereof may be omitted. Hereinafter, it is assumed that the wearable device 100 is the same as the wearable device 200 of FIG. 1.

The wearable device 200 may include a modality source identifier 210, an unobtained modality source generator 220, a PWM signal generator 230, and a multi-modality output device 240. At least some of the functions of the modality source identifier 210, the unobtained modality source generator 220, and the PWM signal generator 230 may be performed by at least one processor included in the wearable device 200.

The modality source identifier 210 may receive modality source data MSD from an external device or a user. The modality source identifier 210 may analyze the modality source data MSD. The modality source identifier 210 may determine whether image data ID, text data TD, and sound data SD are included in the modality source data MSD.

In a case in which all of the image data ID, the text data TD, and the sound data SD are included in the modality source data MSD, the modality source identifier 210 may transmit the modality source data MSD to the multi-modality output device 240.

In a case in which the modality source data MSD does not include at least one of the image data ID, the text data TD, or the sound data SD, the modality source identifier 210 may transmit the modality source data MSD to both the unobtained modality source generator 220 and the multi-modality output device 240 (either directly, or via an intermediary such as the unobtained modality source generator 220). In an embodiment of the disclosure, based on the modality source data MSD including the sound data SD, the modality source identifier 210 may transmit the sound data SD to the PWM signal generator 230.

The unobtained modality source generator 220 may generate image data ID', text data TD', and sound data SD', which are not included in the modality source data MSD. The unobtained modality source generator 220 may receive the modality source data MSD. The operation of generating the image data ID', the text data TD', and the sound data SD' based on the modality source data MSD is described with reference to FIG. 1, the descriptions thereof are omitted. The unobtained modality source generator 220 may transmit the sound data SD' to the PWM signal generator 230.

In an embodiment of the disclosure, the unobtained modality source generator 220 may include a trained neural network 221. The trained neural network 221 may be a generator included in a GAN model. The trained neural network 221 may generate the image data ID', the text data TD', and the sound data SD' based on the modality source data MSD. A process of training the trained neural network 221 is described in detail below with reference to FIG. 3.

The unobtained modality source generator 220 may transmit, to the multi-modality output device 240, the image data ID', the text data TD', and the sound data SD', which are not included in the modality source data MSD but are generated by the unobtained modality source generator 220.

The PWM signal generator 230 may receive the sound data SD from the modality source identifier 210, or may receive the sound data SD' from the unobtained modality source generator 220. The PWM signal generator 230 may generate a PWM signal PWMS based on the sound data SD or SD'. For example, the PWM signal generator 230 may generate the PWM signal PWMS by pulse-width-modulating a sound energy waveform of the sound data SD or SD'. In an embodiment of the disclosure, the PWM signal generator 230 may generate the PWM signal PWMS according to the sound energy waveform of the sound data SD, SD' (i.e., characteristics of the sound data) or the type of application. The PWM signal generator 230 may generate the PWM signal PWMS based on a mapping table for mapping a sound energy waveform (i.e., characteristics of sound data) or an application type and the PWM signal PWMS. A detailed configuration and function of the PWM signal generator 230 are described in detail below with reference to FIGS. 4A and 4B.

The multi-modality output device 240 may output the multi-modality based on the modality source data MSD (e.g., at least one of the image data ID, the text data TD, and the sound data SD), the image data ID', the text data TD', and the sound data SD', which are not included in the modality source data MSD but are generated by the unobtained modality source generator 220, and the PWM signal PWMS.

In an embodiment of the disclosure, the multi-modality output device 240 may include an actuator, a display, and a speaker. For example, the actuator may output a tactile modality based on the PWM signal PWMS. For example, the display may output a visual modality based on image data (e.g., ID or ID') and text data (e.g., TD or TD'). For example, the speaker may output an auditory modality based on sound data (e.g., SD or SD').

Figure 3:
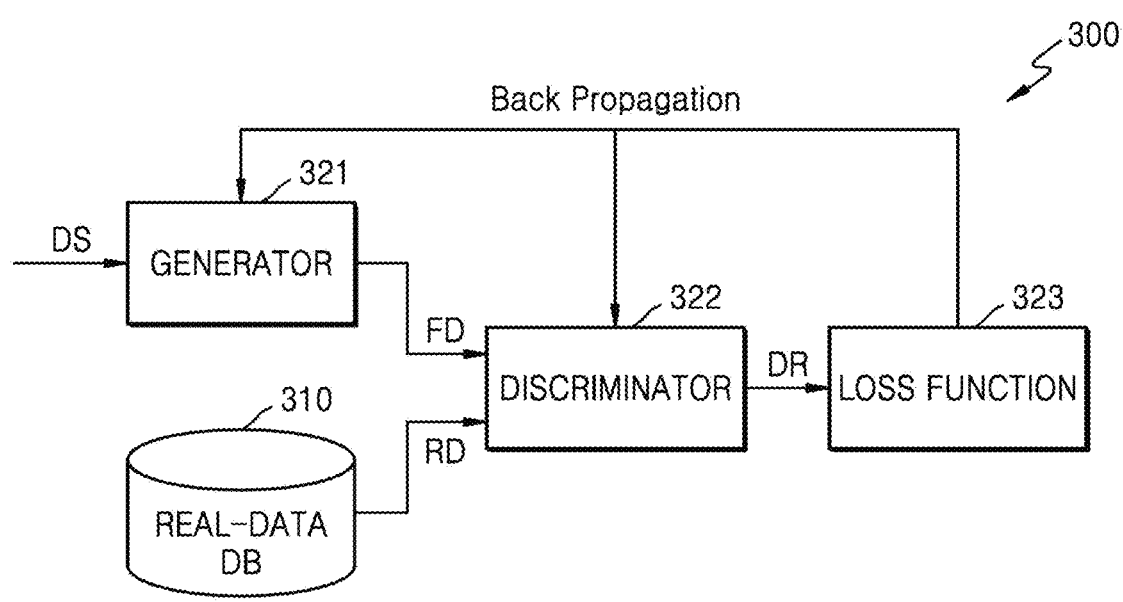
FIG. 3 is a block diagram illustrating a method of training a generative adversarial network according to an embodiment of the disclosure.

FIG. 3 is a block diagram illustrating a method of training a GAN 300 according to an embodiment of the disclosure. The GAN 300 may include a generator 321, a discriminator 322, and a loss function 323. The GAN 300 is a model in which the generator 321 and the discriminator 322 improve their performance by learning and contesting with each other. Each of the generator 321 and the discriminator 322 may include at least one layer. The layer may include a filter including weight information for extracting features from input data.

The generator 321 may be trained to output fake data FD by using a data set DS as an input. The data set DS may be a set of data including at least one of an image, a text, or a sound. The fake data FD may be fake image data, fake text data, or fake sound data.

The real-data database (DB) 310 may include a set of real data RD. The real data RD may correspond to the fake data FD. For example, in a case in which the fake data FD is fake image data, the real data RD may be real image data.

The discriminator 322 may be trained to determine whether the fake data FD or the real data RD, which is received as an input, is fake.

The loss function 323 may calculate a loss function value based on a discrimination result DR. The loss function value may be transmitted to the discriminator 322 and the generator 321 through backpropagation. A weight of at least one layer included in each of the discriminator 322 and the generator 321 may be refined based on the loss function value.

In an embodiment of the disclosure, the generator 321 may include a plurality of sub-generators, depending on the type of the data set DS and output data. For example, a first sub-generator may be trained to output fake sound data by using a data set of image data received as an input. For example, a second sub-generator may be trained to output fake text data by using a data set of image data received as an input. For example, a third sub-generator may be trained to output fake sound data by using a data set of image data and text data received as an input. However, the disclosure is not limited thereto, and the generator 321 may include sub-generators with an arbitrary combination of types of data set (e.g., a set of data including at least one of an image, a text, or a sound) and output data (e.g., fake image data, fake text data, or fake sound data).

In an embodiment of the disclosure, similarly, the discriminator 322 may include a plurality of sub-discriminators, depending on the type of output data output by the generator 321, i.e., the fake data FD. For example, a first sub-discriminator may be trained to determine whether fake sound data or real sound data, which is received as an input, is fake. A second sub-discriminator may be trained to determine whether fake image data or real image data, which is received as an input, is fake. A third sub-discriminator may be trained to determine whether fake text data or real text data, which is received as an input, is fake.

Referring to FIG. 3 together with FIG. 2, the generator 321 may be trained through the above-described process of training a GAN, and the configuration, function, and operation of the trained generator 321 may be similar to those of the trained neural network 221 of FIG. 2.

Figure 4A:
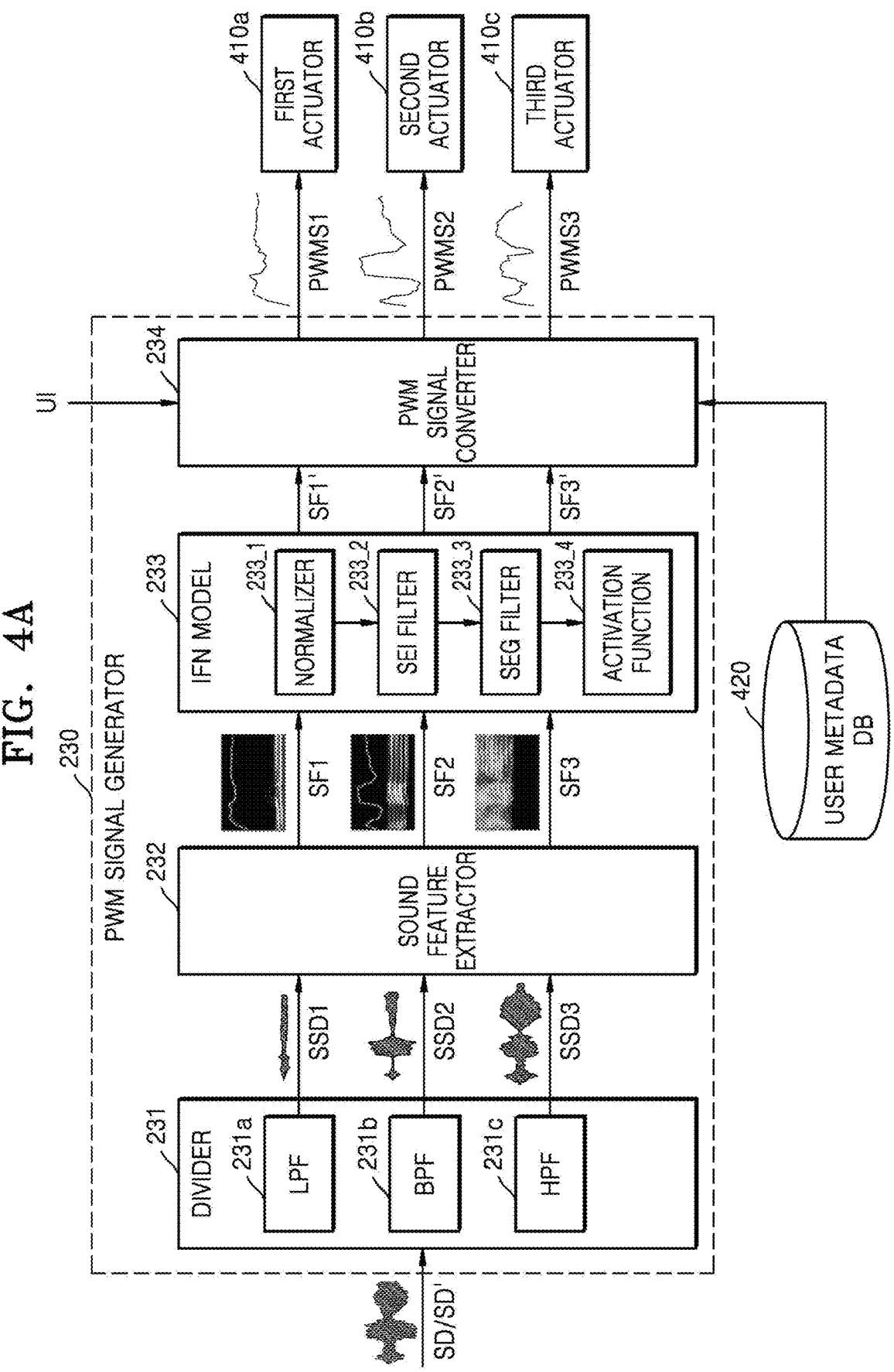

FIGS. 4A and 4B are block diagrams illustrating in more detail the PWM signal generator 230 of FIG. 2.

Referring to FIG. 4A together with FIG. 2, the PWM signal generator 230 may include a divider 231, a sound feature extractor 232, an IFN model 233, and a PWM signal converter 234.

The divider 231 may receive sound data (e.g., SD or SD') from the modality source identifier 210 or the unobtained modality source generator 220. The divider 231 may measure an energy spectrum for a frequency range of the sound data (e.g., SD or SD'). The divider 231 may generate sub-sound data (e.g., SSD1, SSD2, and SSD3) on a preset scale (e.g., linear, logarithmic ($\log_{10}$, ln, Mel), exponential, etc.), based on the measured energy spectrum. For example, the number of pieces of sub-sound data (e.g., SSD1, SSD2, and SSD3) may be equal to the number of actuators (e.g., 410a, 410b, and 410c). For convenience of description, it is illustrated that the number of actuators and the number of pieces of sub-sound data are three, but the disclosure is not limited thereto.

The divider 231 may include at least one filter (e.g., 231a, 231b, and 231c). The at least one filter (e.g., 231a, 231b, and 231c) may filter at least one piece of sub-sound data (e.g., SSD1, SSD2, and SSD3) according to a frequency component of the sound data (e.g., SD or SD'). Each of the at least one filter (e.g., 231a, 231b, and 231c) may correspond to one channel separated in a frequency domain. Accordingly, the three filters 231a, 231b, and 231c shown as an example may output three sub-sound data SSD1, SSD2, and SSD3 corresponding to the three channels included in the multi-channel.

For example, the divider 231 may include a low-pass filter (LPF) 231a, a band-pass filter (BPF) 231b, and a high-pass filter (HPF) 231c. The LPF 231a may be a filter that attenuates signals with a frequency greater than a first cutoff frequency, among signals corresponding to the sound data (e.g., SD or SD'), and thus passes only signals with a frequency less than or equal to the first cutoff frequency. The LPF 231a may output first sub-sound data SSD1 based on the sound data (e.g., SD or SD'). The BPF 231b may be a filter that passes only signals with a frequency between the first cutoff frequency and a second cutoff frequency, among the signals corresponding to the sound data (e.g., SD or SD'). The BPF 231b may output second sub-sound data SSD2 based on the sound data (e.g., SD or SD'). The HPF 231c may be a filter that attenuates signals with a frequency less than the second cutoff frequency, among the signals corresponding to the sound data (e.g., SD or SD'), and thus passes only signals with a frequency greater than or equal to the second cutoff frequency. The HPF 231c may output third sub-sound data SSD3 based on the sound data (e.g., SD or SD').

Based on the at least one piece of sub-sound data (e.g., SSD1, SSD2, and SSD3), the sound feature extractor 232 may extract at least one sound feature (e.g., SF1, SF2, and SF3) respectively corresponding to the pieces of sub-sound data. For example, the at least one sound feature (e.g., SF1, SF2, and SF3) may include at least one of sound energy (may also be referred to as amplitude), frequency, pitch, and intensity of each of the at least one piece of sub-sound data (e.g., SSD1, SSD2, and SSD3), but the disclosure is not limited thereto. For example, sound features may be extracted by using a spectrogram technique, but the disclosure is not limited thereto, and spectrum, Mel spectrogram, and Mel-frequency cepstral coefficient (MFCC) techniques may be used.

For example, the sound feature extractor 232 may extract at least one first sound feature SF1 based on the first sub-sound data SSD1. The sound feature extractor 232 may extract at least one second sound feature SF2 based on the second sub-sound data SSD2. The sound feature extractor 232 may extract at least one third sound feature SF3 based on the third sub-sound data SSD3.

In an embodiment of the disclosure, in a case in which a plurality of sound features (e.g., SF1, SF2, and SF3) correspond to pieces of sub-sound data (e.g., SSD1, SSD2, and SSD3), respectively, (e.g., in a case in which sound features (e.g., SF1, SF2, and SF3) are at least two of sound energy, frequency, pitch, or intensity of at least one piece of sub-sound data (e.g., SSD1, SSD2, and SSD3)), the IFN model 233 may calculate a correlation between the sound features, and a statistical distribution (e.g., a variance) of each of the sound features. The IFN model 233 may select a representative sound feature from among the sound features.

The IFN model 233 may calculate the variance of the sound features (e.g., SF1, SF2, and SF3) (or the representative sound feature). The IFN model 233 may identify whether the variance of the sound features (e.g., SF1, SF2, and SF3) is greater than a threshold. In a case in which the variance of the sound features (e.g., SF1, SF2, ad SF3) is greater than the threshold, the IFN model 233 may filter the sound features (e.g., SF1, SF2, and SF3) based on the sound energy intensity and sound energy gradient of the at least one piece of sub-sound data (e.g., SSD1, SSD2, and SSD3). The IFN model 233 may transmit filtered sound features (e.g., SF1', SF2', and SF3') to the PWM signal converter 234. For example, the sound energy intensity may indicate the volume of a sound corresponding to the sound data. For example, the sound energy intensity may be expressed in units of decibels (dB). For example, the sound energy gradient may indicate an amount of change in sound energy intensity per unit time. For example, the sound energy gradient may be expressed in ddB/dt.

In an embodiment of the disclosure, the IFN model 233 may include a normalizer 233_1, a sound energy intensity filter 233_2 (hereinafter, referred to as the SEI filter 233_2), a sound energy gradient filter 233_3 (hereinafter, referred to as the SEG filter 233_3), and an activation function 233_4.

The normalizer 233_1 may normalize the sound features (e.g., SF1, SF2, and SF3) in the time domain and the energy domain. For example, the normalizer 233_1 may normalize the sound features based on the maximum and minimum values of the sound energy intensity.

The SEI filter 233_2 may calculate an intensity threshold based on a distribution (e.g., a variance) of sound energy intensity of the at least one piece of sub-sound data (e.g., SSD1, SSD2, and SSD3). In an embodiment of the disclosure, the intensity threshold may be calculated according to a predefined equation. In an embodiment of the disclosure, the intensity threshold may be a preset value. The SEI filter 233_2 may extract, from the sound features (e.g., SF1, SF2, and SF3), sections in which the intensity threshold of the sound energy intensity of the at least one piece of sub-sound data (e.g., SSD1, SSD2, and SSD3) is exceeded, and sections in which the intensity threshold is not exceeded.

The SEG filter 233_3 may calculate a gradient threshold based on a distribution of sound energy gradient of the at least one piece of sub-sound data (e.g., SSD1, SSD2, and SSD3). In an embodiment of the disclosure, the gradient threshold may be calculated according to a predefined equation. In an embodiment of the disclosure, the gradient threshold may be a preset value. The SEG filter 233_3 may extract, from the sound features (e.g., SF1, SF2, and SF3), sections in which the gradient threshold of the sound energy gradient of the at least one piece of sub-sound data (e.g., SSD1, SSD2, and SSD3) is exceeded, and sections in which the gradient threshold is not exceeded. The IFN model 233 may pass sections of the sound features in which the intensity threshold and the gradient threshold are exceeded. The IFN model 233 may attenuate sections of the sound features in which at least one of the intensity threshold and the gradient threshold are not exceeded, by applying a preset weight to the sections. The function of the IFN model 233 to pass or attenuate a section of a certain sound feature may be referred to as the activation function 233_4. Sound features (e.g., SF1', SF2', and SF3') filtered by the activation function 233_4 may be transmitted to the PWM signal converter 234.

In a case in which the variance of the sound features (e.g., SF1, SF2, and SF3) is not greater than the threshold, the IFN model 233 may transmit the sound features (e.g., SF1, SF2, and SF3) to the PWM signal converter 234.

The PWM signal converter 234 may generate at least one PWM signal (e.g., PWMS1, PWMS2, and PWMS3) based on the sound features (e.g., SF1, SF2, and SF3) or the filtered sound features (e.g., SF1', SF2', and SF3'). The PWM signal converter 234 may generate the at least one PWM signal (e.g., PWMS1, PWMS2, and PWMS3) by mapping the sound energy intensity with the duty cycle of the at least one piece of sub-sound data (e.g., SSD1, SSD2, and SSD3) corresponding to the sound features (e.g., SF1, SF2, and SF3) or the filtered sound features (e.g., SF1', SF2', and SF3').

For example, the PWM signal converter 234 may generate a first PWM signal PWMS1 based on a first sound feature (e.g., SF1 or SF1'). The first PWM signal PWMS1 may be transmitted to a first actuator 410a. The PWM signal converter 234 may generate a second PWM signal PWMS2 based on a second sound feature (e.g., SF2 or SF2'). The second PWM signal PWMS2 may be transmitted to a second actuator 410b. The PWM signal converter 234 may generate a third PWM signal PWMS3 based on a third sound feature (e.g., SF3 or SF3'). The third PWM signal PWMS3 may be transmitted to a third actuator 410c. Here, the first to third actuators 410a, 410b, and 410c may be included in the wearable device 200.

In an embodiment of the disclosure, a plurality of PWM signals corresponding to different frequencies may be converted into vibration signals by the actuators 410a, 410b, and 410c. Vibration signals of multi-channels including channels corresponding to different frequencies are effectively transmitted to the user, thereby improving the user's tactile response.

In an embodiment of the disclosure, the PWM signal converter 234 may obtain user speech characteristics from a user metadata DB 420. The PWM signal converter 234 may adjust the at least one PWM signal (e.g., PWMS1, PWMS2, and PWMS3) based on the user speech characteristics. For example, the PWM signal converter 234 may perform time-domain re-scaling or waveform interval shifting on a PWM signal (e.g., PWMS1, PWMS2, or PWMS3). In an embodiment of the disclosure, by generating a PWM signal reflecting the user speech characteristics, better haptic feedback may be delivered to a user. For example, the user speech characteristics may be data corresponding to the user's voices (e.g., a quiet voice, a loud voice, a low-pitched voice, a high-pitched voice, a slow voice, a fast voice, an echoing voice, a hoarse voice, a cracking voice, etc.).

In an embodiment of the disclosure, the PWM signal converter 234 may obtain (or receive) a user input UI. The PWM signal converter 234 may adjust the at least one PWM signal (e.g., PWMS1, PWMS2, and PWMS3) based on the user input UI. In an embodiment of the disclosure, by generating a PWM signal reflecting a user input, better haptic feedback may be delivered to the user.

Referring to FIG. 4B together with FIG. 2, in an embodiment of the disclosure, the PWM signal generator 230 may include the sound feature extractor 232, the IFN model 233, and the PWM signal converter 234. That is, the divider 231 illustrated in FIG. 4A may be omitted. The configurations, functions, and operations of the sound feature extractor 232 and the IFN model 233 are similar to those of the sound feature extractor 232 and the IFN model 233 described above with reference to FIG. 4A, and thus, redundant descriptions thereof are omitted.

The sound feature extractor 232 may receive sound data (e.g., SD or SD') from the modality source identifier 210 or the unobtained modality source generator 220. The sound feature extractor 232 may extract a sound feature SF based on the sound data (e.g., SD or SD'). The IFN model 233 may calculate a variance of the sound feature SF. In a case in which the variance of the sound feature SF is greater than a threshold, the IFN model 233 may filter the sound feature SF, and transmit a filtered sound feature SF' to the PWM signal converter 234. In a case in which the variance of the sound feature SF is not greater than the threshold, the IFN model 233 may transmit the sound feature SF to the PWM signal converter 234.

The PWM signal converter 234 may generate a PWM signal PWMSA and a partial PWM signal PWMSP based on the sound feature (e.g., SF or SF'). The PWM signal converter 234 may generate the PWM signal PWMSA by mapping the sound energy intensity with duty cycle of the sound data SD or SD' corresponding to the sound feature SF or the filtered sound feature SF'.

A signal corresponding to an entire area DCI2 of a signal obtained through conversion may be referred to as the PWM signal PWMSA, and a signal corresponding to a partial area DCI1 of the signal obtained through the conversion may be referred to as the partial PWM signal PWMSP. The partial area DCI1 may be an area in which the duty cycle is greater than a preset value. For example, the partial area DCI1 may be an area in which the duty cycle is greater than 200. The PWM signal PWMSA may be transmitted to the second actuator 410b. The partial PWM signal PWMSP may be transmitted to the first and third actuators 410a and 410c.

Figure 5:
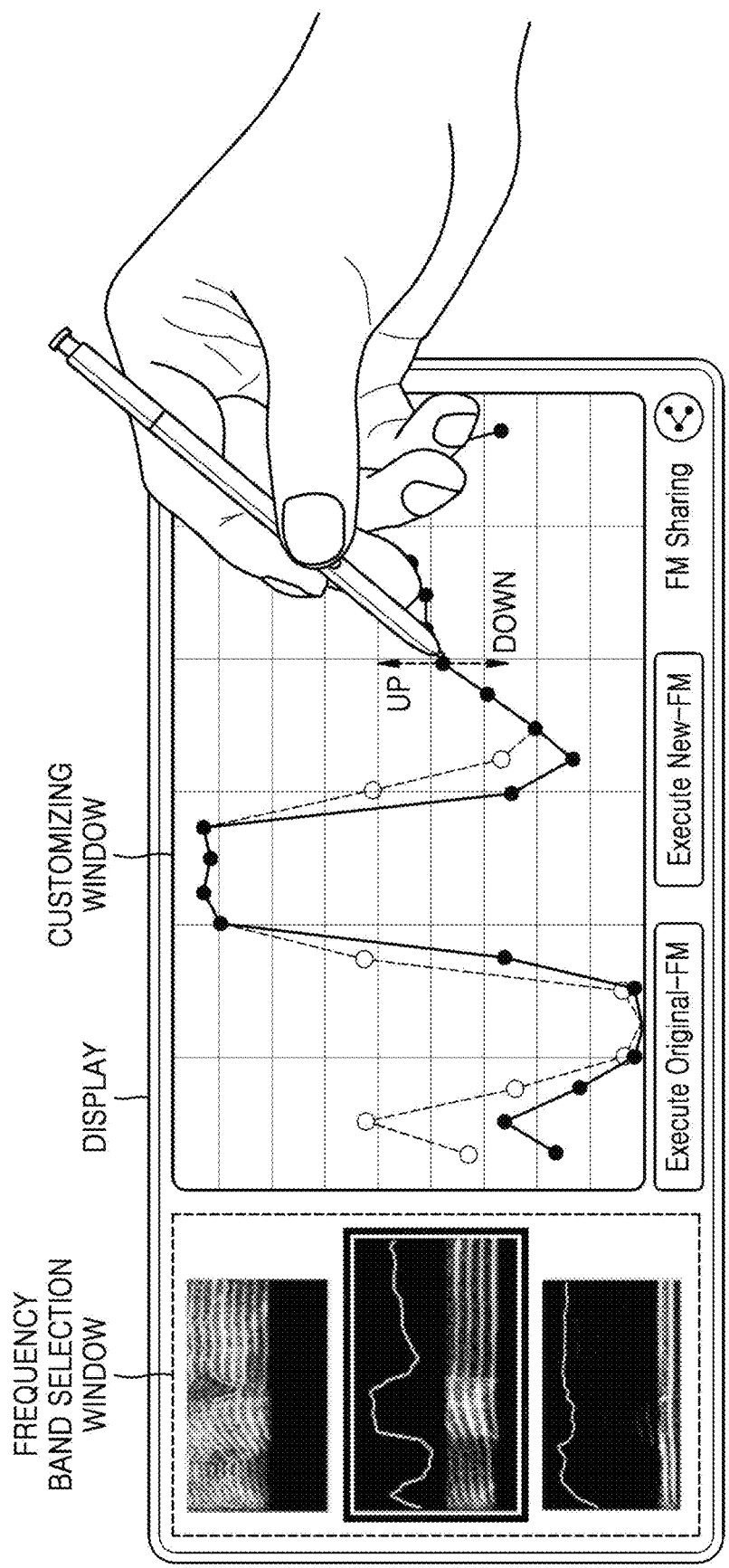
FIG. 5 is a conceptual diagram for describing a method, performed by a wearable device, of adjusting a PWM signal, based on a user input, according to an embodiment of the disclosure.

FIG. 5 is a conceptual diagram for describing a method, performed by a wearable device, of adjusting a PWM signal based on a user input, according to an embodiment of the disclosure. Referring to FIG. 5 together with FIGS. 1 to 4B, the wearable device 100 or 200 may receive a user input. For example, the user input may be input as a touch input on a display directly connected to the wearable device 100 or 200 or a display of an external device, but the disclosure is not limited to a user input being received as a touch input.

The wearable device 100 or 200 may display a frequency band selection window and a customizing window on the display. Visualized data corresponding to sub-sound data filtered based on at least one filter may be displayed in the frequency band selection window. The wearable device 100 or 200 may receive a first user input for selecting a frequency band. In response to the first user input, the wearable device 100 or 200 may display, on the display (e.g., in the customizing window), visualized data of a PWM signal corresponding to the selected frequency band.

The wearable device 100 or 200 may receive a second user input for adjusting the PWM signal. For example, the second user input may correspond to data for increasing (UP) or decreasing (DOWN) the duty cycle at a certain point of the PWM signal. Although not illustrated, the second user input may correspond to data for adjusting the time domain of the PWM signal.

Figure 6:
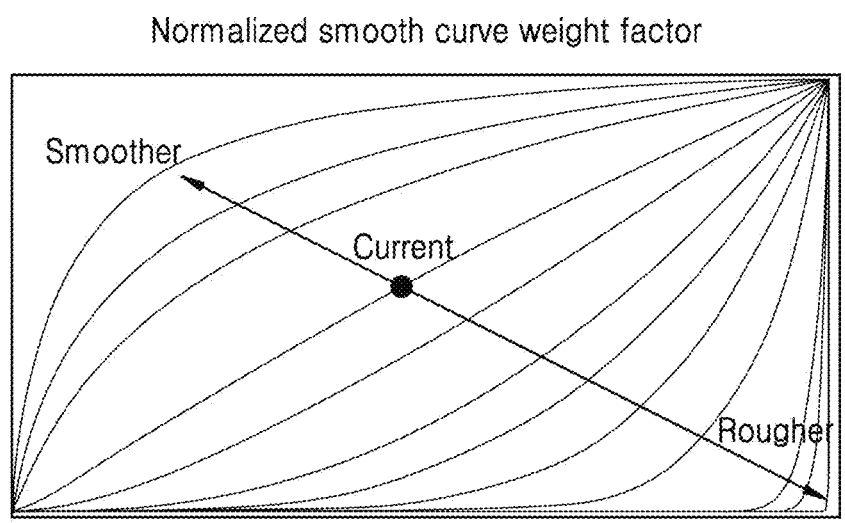
FIG. 6 is a conceptual diagram for describing a method, performed by a wearable device, of adjusting a PWM signal by using a curve weight factor, according to an embodiment of the disclosure.

FIG. 6 is a conceptual diagram for describing a method, performed by a wearable device, of adjusting a PWM signal by using a curve weight factor, according to an embodiment of the disclosure. Referring to FIG. 5 together with FIGS. 1 to 4B, the PWM signal generator 230 of the wearable device 100 or 200 may apply a curve weight factor to a PWM signal. In an embodiment of the disclosure, by applying the curve weight factor to the PWM signal, smoothing filtering or roughing filtering may be performed on the PWM signal.

Figure 7A:
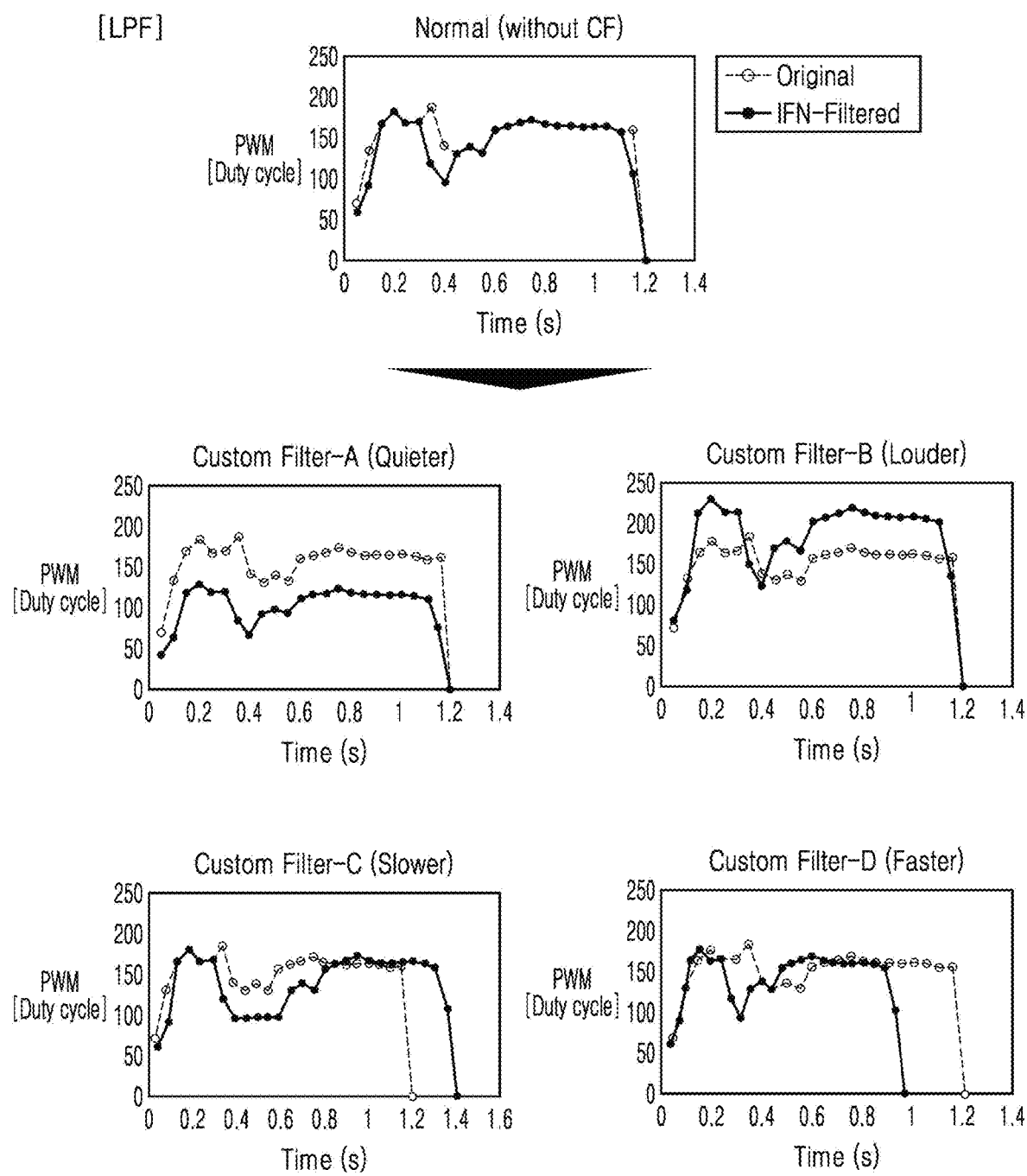
FIGS. 7A to 7C are conceptual diagrams for describing a method, performed by a wearable device, of adjusting a PWM signal, based on user speech characteristics, according to an embodiment of the disclosure.
Figure 7B:
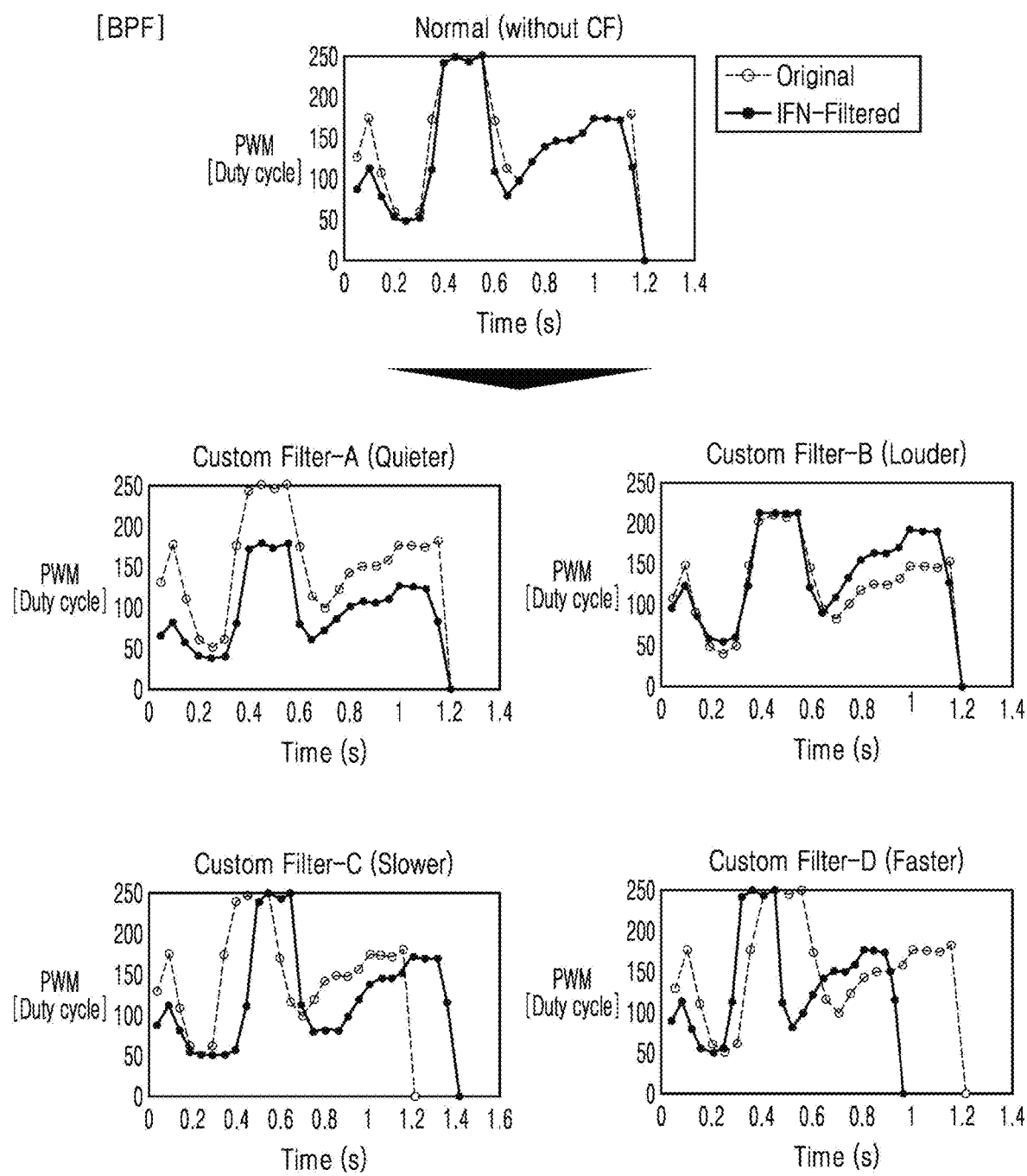
Figure 7C:
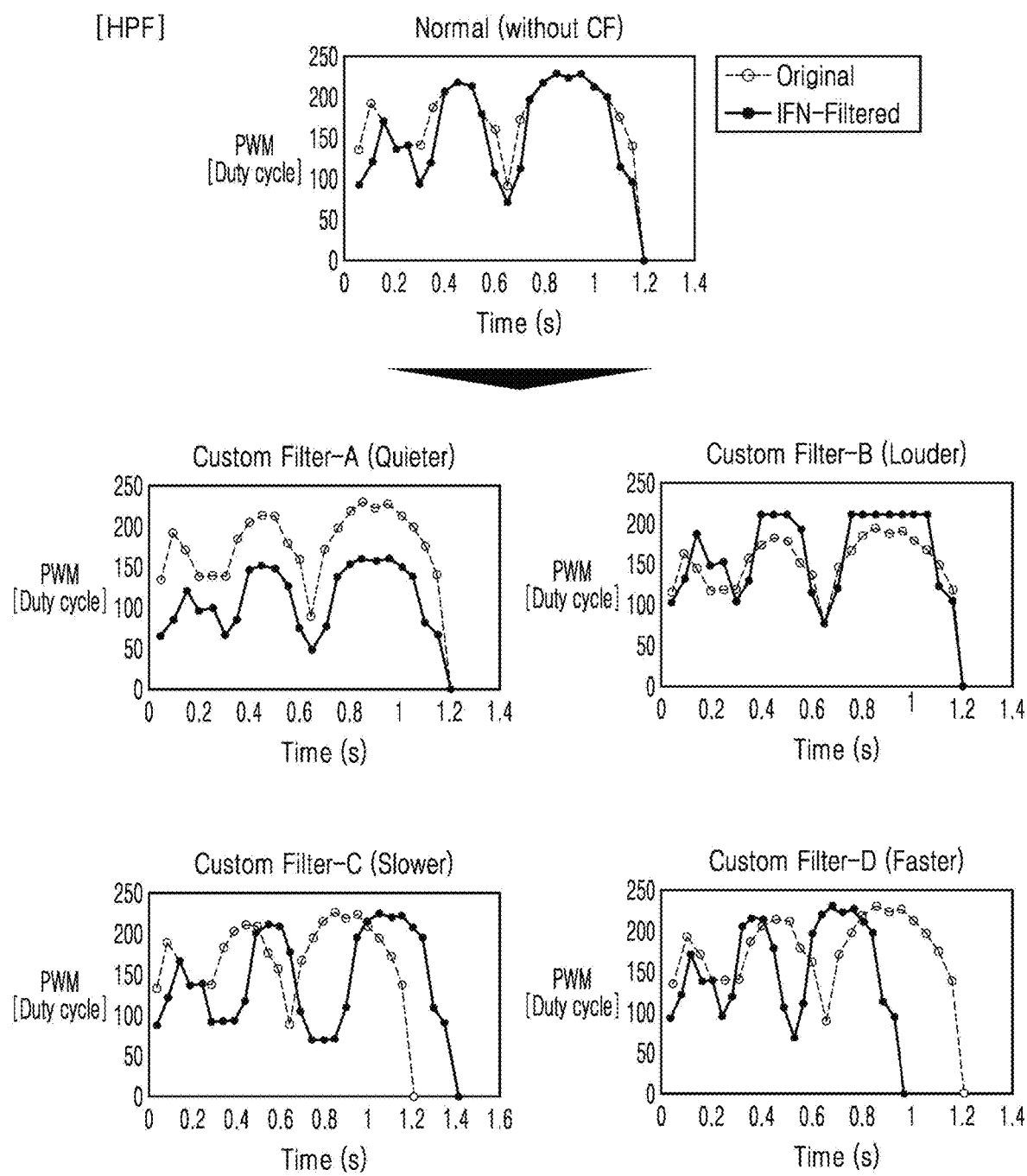

FIGS. 7A to 7C are conceptual diagrams for describing a method, performed by a wearable device, of adjusting a PWM signal based on user speech characteristics, according to an embodiment of the disclosure. Referring to FIGS. 7A to 7B together with FIGS. 1 to 4B, the wearable device 100 or 200 may obtain user speech characteristics from a user metadata DB. The wearable device 100 or 200 may select a custom filter based on the user speech characteristics. The custom filter may be determined based on the manufacturer's setting or a user's input. For example, the custom filter may include, but is not limited to, a quieter filter, a louder filter, a slower filter, and a faster filter. The wearable device 100 or 200 may adjust a PWM signal by using the custom filter selected based on the user speech characteristics.

For example, the quieter filter may be a filter that reduces the duty cycle of a PWM signal by a certain percentage. In a case in which the user's voice is loud or high-pitched, by using the quieter filter according to an embodiment of the disclosure, the intensity of the PWM signal may be reduced, such that the user's tactile perception is improved. For example, the louder filter may be a filter that increases the duty cycle of a PWM signal by a certain percentage. In a case in which the user's voice is quiet or low-pitched, by using the louder filter according to an embodiment of the disclosure, the intensity of the PWM signal may be increased, such that the user's tactile perception is improved. For example, the slower filter may be a filter that extends the time domain of a PWM signal by a certain percentage. In a case in which the user's voice is fast, by using the slower filter according to an embodiment of the disclosure, the speed of the PWM signal may be reduced, such that the user's tactile perception is improved. For example, the faster filter may be a filter that reduces the time domain of a PWM signal by a certain percentage. In a case in which the user's voice is slow, by using the faster filter according to an embodiment of the disclosure, the speed of the PWM signal may be increased, such that the user's tactile perception is improved.

Figure 8:
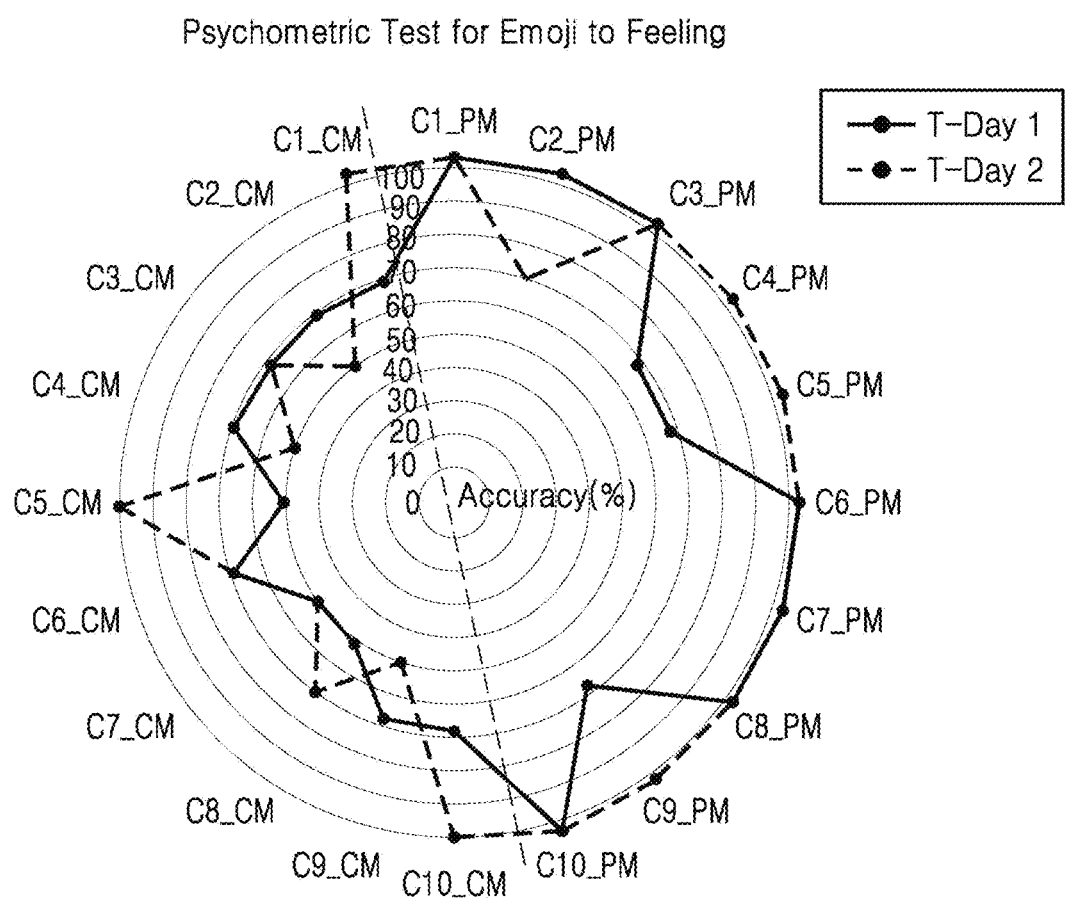
FIG. 8 is a conceptual diagram illustrating an effect of a wearable device according to an embodiment of the disclosure.

FIG. 8 is a conceptual diagram for describing an effect of an IFN model according to an embodiment of the disclosure. Referring to FIG. 8 together with FIGS. 1 to 4B, the wearable device 100 or 200 may provide a multi-modality to a user. The wearable device 100 or 200 may filter a sound feature by using the IFN model 233. FIG. 8 shows results of testing the accuracy of each of ten users in distinguishing between emojis (data including images, texts, and sounds) corresponding to a tactile modality, in a case in which the wearable device 100 or 200 provides the tactile modality to each of the users by using the IFN model 233 (C1_PM, C2_PM, . . . , C10_PM), and in a case in which the wearable device 100 or 200 provides the tactile modality to each of the users without using the IFN model 233 (C1_CM, C2_CM, . . . , C10_CM). Referring to FIG. 8, it may be seen that better accuracy is achieved in a case in which the wearable device 100 or 200 uses the IFN model 233. That is, as the wearable device 100 or 200 uses the IFN model 233, the tactile perception of the users may be improved.

Figure 9A:
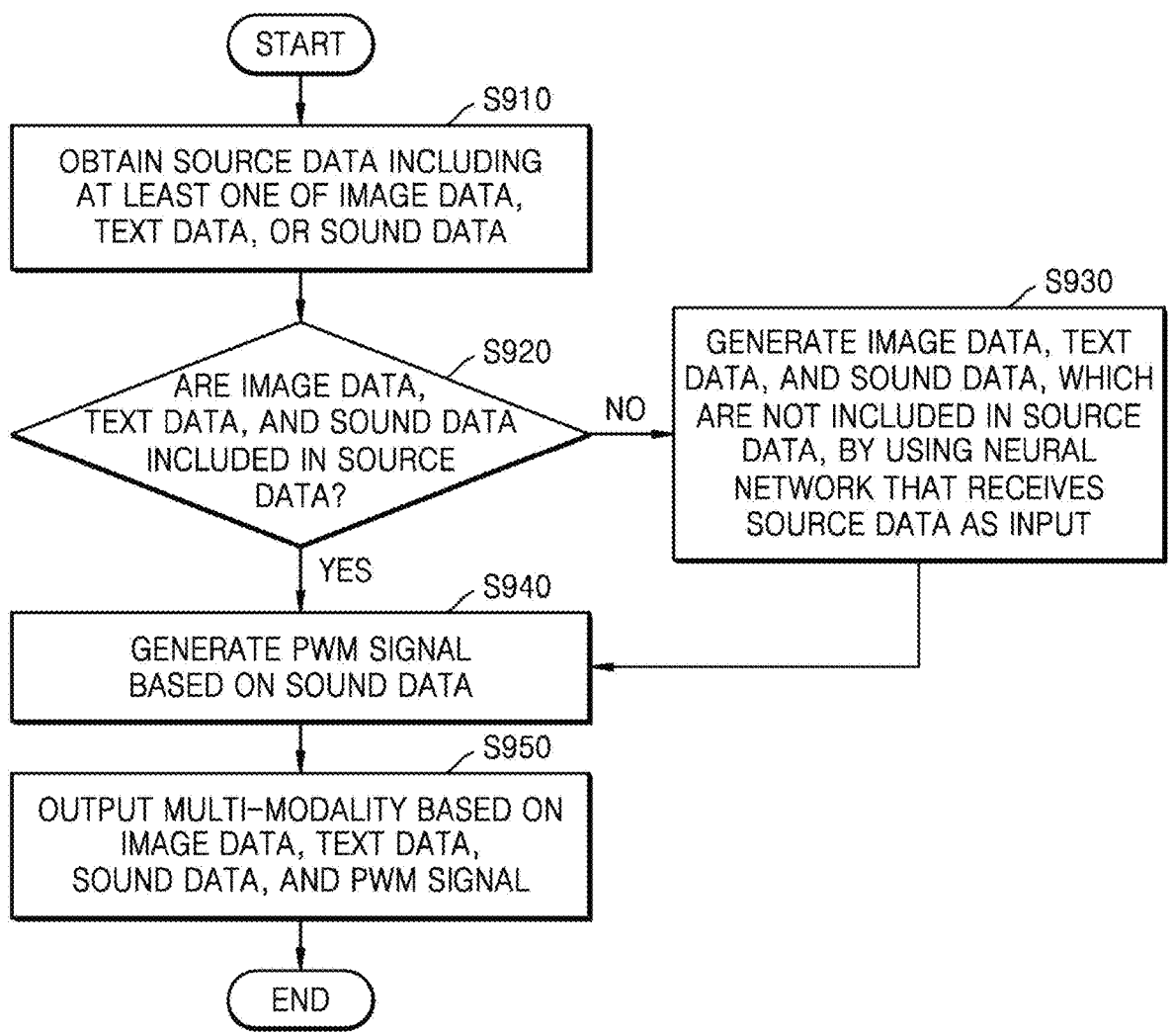
FIG. 9A is a flowchart for describing an operation method of a wearable device according to an embodiment of the disclosure.

FIG. 9A is a flowchart for describing an operation method of a wearable device according to an embodiment of the disclosure. For convenience of description, FIG. 9A is described with reference to FIGS. 1 to 4B. The operation method of the wearable device 100 or 200 may include operations S910 to S950. In an embodiment of the disclosure, operations S910 to S950 may be performed by the wearable device 100 or 200 or a processor of the wearable device 100 or 200. The operation method of the wearable device 100 or 200 according to an embodiment of the disclosure is not limited to the operations illustrated in FIG. 9A, and any one of the operations illustrated in FIG. 9A may be omitted, and operations not illustrated in FIG. 9A may be further added.

In operation S910, the wearable device 100 or 200 may obtain source data including at least one of image data, text data, or sound data. For example, the source data may include image data. The source data may include text data. The source data may include sound data. The source data may include image data and text data. The source data may include image data and sound data. The source data may include text data and sound data. The source data may include image data, text data, and sound data.

In operation S920, the wearable device 100 or 200 may identify whether image data, text data, and sound data are included in the source data. In a case in which at least one of image data, text data, or sound data is not included in the source data, the operation method proceeds to operation S930. In a case in which all of image data, text data, and sound data are included in the source data, the operation method proceeds to operation S940. Sub-operations of operation S920 are described in detail below with reference to FIG. 9B.

In operation S930, the wearable device 100 or 200 generates image data, text data, and sound data, which are not included in the source data, by using a (trained) neural network (e.g., a generator of a GAN) that receives the source data as an input, and then the operation method proceeds to operation S940.

In an embodiment of the disclosure, the neural network may be a generator of a GAN. The GAN may be a model that is pre-trained by obtaining training source data that does not include at least one of image data, text data, or sound data, generating, by using a generator that receives the training source data as an input, virtual data corresponding to at least one of image data, text data, or sound data that is not included in the training source data, determining, by using a discriminator that receives virtual data and real data corresponding to the virtual data as an input, whether the virtual data and the real data are real, and training the generator and the discriminator based on a result of the determining.

In operation S940, the wearable device 100 or 200 may generate a PWM signal based on the sound data. Sub-operations of operation S940 are described in detail below with reference to FIG. 9C or 9D. In an embodiment of the disclosure, the wearable device 100 or 200 may obtain user speech characteristics from user metadata. The wearable device 100 or 200 may adjust the PWM signal based on the user speech characteristics. In an embodiment of the disclosure, the wearable device 100 or 200 may obtain a user input. The wearable device 100 or 200 may adjust the PWM signal based on the user input.

In operation S950, the wearable device 100 or 200 outputs a multi-modality based on the image data, the text data, the sound data, and the PWM signal, and then the operation method ends. The wearable device 100 or 200 may output a visual modality based on the image data and the text data. The wearable device 100 or 200 may output an auditory modality based on the sound data. The wearable device 100 or 200 may output a tactile modality based on the PWM signal.

Figure 9B:
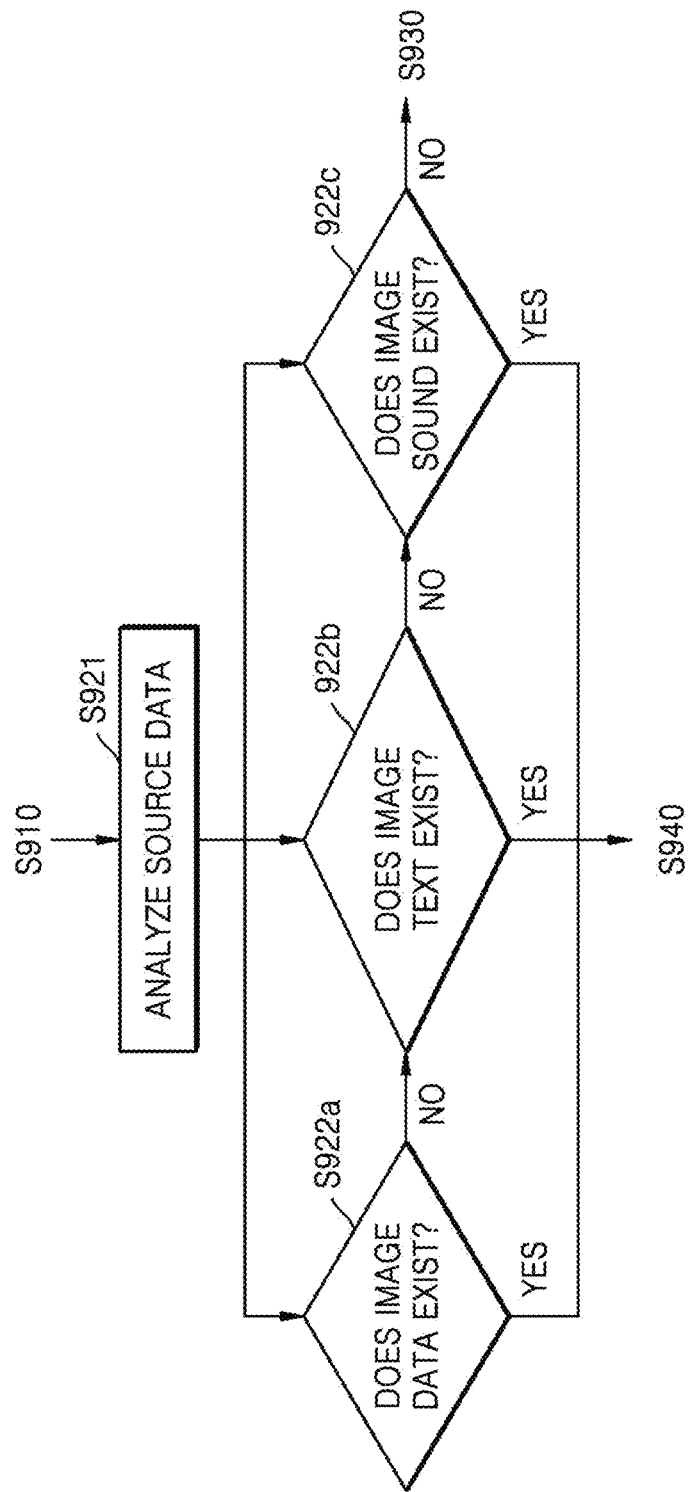
FIG. 9B is a flowchart for describing a method of determining whether image data, text data, and sound data are included in source data, according to an embodiment of the disclosure.

FIG. 9B is a flowchart for describing a method of determining whether image data, text data, and sound data are included in source data, according to an embodiment of the disclosure. For convenience of description, FIG. 9B is described with reference to FIGS. 1 to 4B, and 9A. According to an embodiment of the disclosure, operation S920 may include operations S921, S922a, S922b, and S922c.

In operation S921, the wearable device 100 or 200 may analyze the source data. In operation S922a, the wearable device 100 or 200 may identify, based on a result of the analyzing, whether image data exists in the source data. In operation S922b, the wearable device 100 or 200 may identify, based on the result of the analyzing, whether text data exists in the source data. In operation S922c, the wearable device 100 or 200 may identify, based on the result of the analyzing, whether sound data exists in the source data. The order in which operations S922a, S922b, and S922c are performed after operation S921 may be determined by the manufacturer's setting or a user's input. In a case in which it is identified, in operations S922a, S922b and S922c, that at least one of image data, text data, or sound data does not exist, the method proceeds to operation S930. In a case in which it is identified, in operations S922a, S922b and S922c, that all of image data, text data, and sound data exist, the method proceeds to operation S940.

Figure 9C:
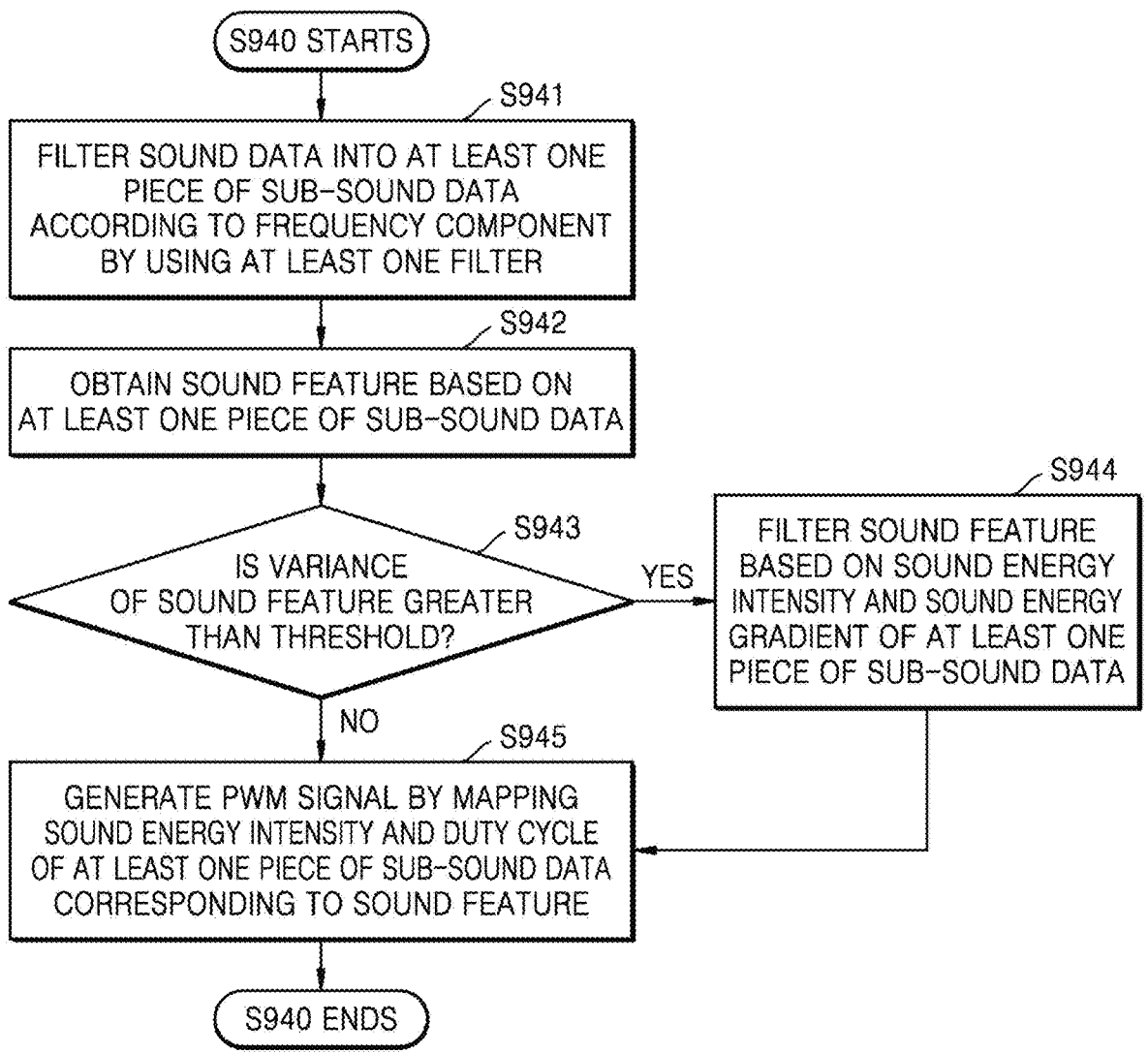
FIGS. 9C and 9D are flowcharts for describing a method of generating a PWM signal, based on sound data, according to an embodiment of the disclosure.
Figure 9D:
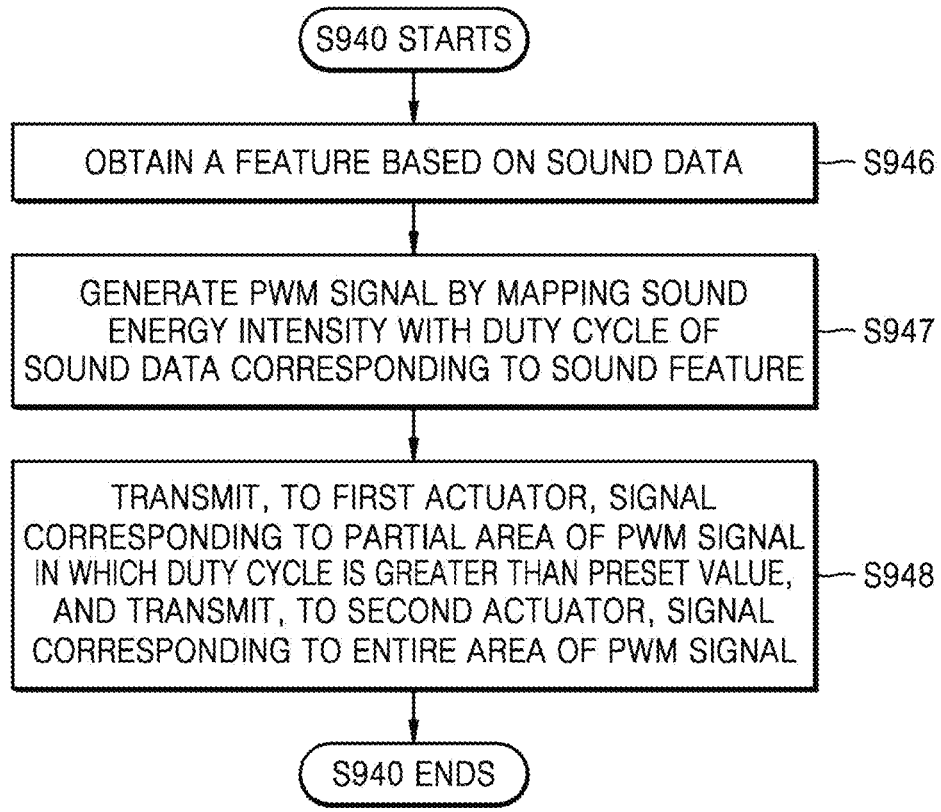

FIGS. 9C and 9D are flowcharts for describing a method of generating a PWM signal based on sound data, according to an embodiment of the disclosure.

For convenience of description, FIG. 9C is described with reference to FIGS. 1 to 4B, and 9A. According to an embodiment of the disclosure, operation S940 may include operations S941, S942, S943, S944 and S945.

In operation S941, the wearable device 100 or 200 may filter sound data into at least one piece of sub-sound data according to a frequency component, by using at least one filter (e.g., an LPF, a BPF, and an HPF).

In operation S942, the wearable device 100 or 200 may obtain a sound feature based on the at least one piece of sub-sound data. In an embodiment of the disclosure, the sound feature may include at least one of sound energy (amplitude), frequency, pitch, or intensity.

In an embodiment of the disclosure, operation S942 may include extracting a plurality of sound features based on the at least one piece of sub-sound data, calculating a correlation between and a variance of the plurality of sound features, and selecting a representative sound feature based on the correlation and the variance.

In operation S943, the wearable device 100 or 200 may identify whether the variance of the sound feature (or the representative sound feature, when selected) is greater than a threshold. In a case in which the variance of the sound feature is greater than the threshold, the method proceeds to operation S944. In a case in which the variance of the sound feature is not greater than the threshold, the method proceeds to operation S945.

In operation S944, the wearable device 100 or 200 may filter the sound feature based on the sound energy intensity and the sound energy gradient of the at least one piece of sub-sound data.

In an embodiment of the disclosure, operation S944 may include normalizing the at least one piece of sub-sound data, extracting, from the sound feature, sections in which the sound energy intensity is greater than an intensity threshold, and sections in which the sound energy intensity is not greater than the intensity threshold, extracting, from the sound feature, sections in which the sound energy gradient is greater than a gradient threshold, and sections in which the sound energy gradient is not greater than the gradient threshold, passing sections of the sound feature in which the sound energy intensity is greater than the intensity threshold and the sound energy gradient is greater than the gradient threshold, and attenuating sections of the sound feature in which the sound energy intensity is not greater than the intensity threshold and/or the sound energy gradient is not greater than the gradient threshold.

In operation S945, the wearable device 100 or 200 may generate a PWM signal by mapping the sound energy intensity with the duty cycle of the at least one piece of sub-sound data corresponding to the sound feature.

For convenience of description, FIG. 9D is described with reference to FIGS. 1 to 4B, and 9A. According to an embodiment of the disclosure, operation S940 may include operations S946, S947, and S948.

In operation S946, the wearable device 100 or 200 may obtain a sound feature based on sound data.

In operation S947, the wearable device 100 or 200 may generate a PWM signal by mapping the sound energy intensity with the duty cycle of the sound data corresponding to the sound feature.

In operation S948, the wearable device 100 or 200 may transmit, to a first actuator, a signal corresponding to a partial area of the PWM signal in which the duty cycle is greater than a preset value, and transmit, to a second actuator, a signal corresponding to the entire area of the PWM signal. In an embodiment of the disclosure, the wearable device 100 or 200 may transmit, to the first actuator and a third actuator, the signal corresponding to the partial area of the PWM signal in which the duty cycle is greater than a preset value, and transmit, to the second actuator, the signal corresponding to the entire area of the PWM signal.

Figure 10:
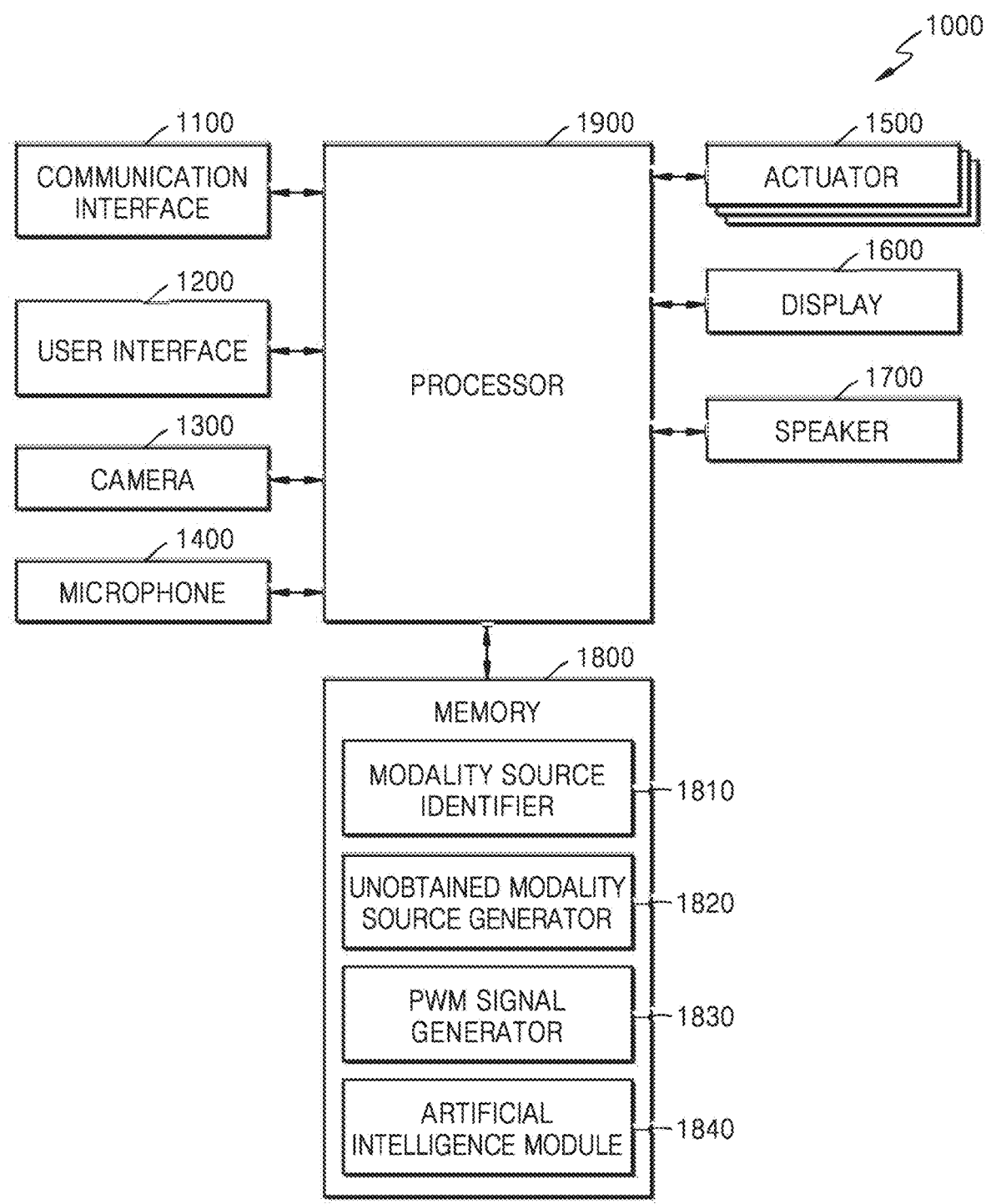
FIG. 10 is a block diagram illustrating a configuration of a wearable device according to an embodiment of the disclosure.

FIG. 10 is a block diagram illustrating a configuration of a wearable device 1000 according to an embodiment of the disclosure. Referring to FIG. 10 together with FIGS. 1 to 4B, the configuration, function, and operation of the wearable device 1000 may be similar to those of the wearable devices 100 and 200.

The wearable device 1000 may include a communication interface 1100, a user interface 1200, a camera 1300, a microphone 1400, at least one actuator 1500, a display 1600, a speaker 1700, a memory 1800, and a processor 1900.

The communication interface 1100 may support establishment of a wired or wireless communication channel between the wearable device 1000 and an external electronic device (not shown) or a server (not shown) and performing of communication through the established communication channel. In an embodiment of the disclosure, the communication interface 1100 may receive or transmit data from or to the external electronic device (not shown) or the server (not shown) data through wired or wireless communication. In an embodiment of the disclosure, the communication interface 1100 may include a wireless communication module (e.g., a cellular communication module, a short-range wireless communication module, or a global navigation satellite system (GNSS) communication module) or a wired communication module (e.g., a local area network (LAN) communication module, or a power line communication module), and may communicate, by using any one of the communication modules, with the external electronic device (not shown) or the server (not shown) through at least one network (e.g., a LAN (e.g., Bluetooth, Wi-Fi direct, or Infrared Data Association (IrDA)) or a telecommunication network (e.g., a cellular network, the Internet, or a computer network (e.g., a LAN or a wide area network (WAN))). For example, the communication interface 1100 may receive modality source data through communication with the external device (e.g., a smart phone, a smart pad, other wearable device worn by the user, a digital camera, a television, a monitor, a laptop computer, a black box, a robot, etc.) or a separate server device.

The user interface 1200 may refer to a unit for a user to input data (may also be referred to as a user input) for controlling the wearable device 1000. For example, the user interface 1200 may include, but is not limited to, at least one of a key pad, a dome switch, a touch pad (e.g., a touch-type capacitive touch pad, a pressure-type resistive overlay touch pad, an infrared sensor-type touch pad, a surface acoustic wave conduction touch pad, an integration-type tension measurement touch pad, a piezoelectric effect-type touch pad), a jog wheel, or a jog switch. In an embodiment of the disclosure, the user interface 1200 may be omitted. In this case, at least some of the functions of the user interface 1200 may be implemented in an external electronic device (not shown).

The camera 1300 may receive light through a lens. The camera 1300 may include an image processor. The image processor (not shown) may generate image data corresponding to an external object based on the received light. In an embodiment, the modality source data may include image data generated by the camera 1300.

The microphone 1400 may receive sound input. The microphone 1400 may generate an audio signal based on the sound input. The modality source data may include sound data corresponding to the audio signal generated by the microphone 1400.

The at least one actuator 1500 may output a tactile modality based on a PWM signal. The at least one actuator 1500 may be arranged on the wearable device 1000 to be in contact with a user's body. That is, haptic feedback by the tactile modality may be delivered to the user. The haptic feedback refers to feedback provided to the user such that the user feels a tactile sensation, such as force or kinesthesia, through force, vibration, motion, etc. The at least one actuator 1500 may include at least one of a linear resonance-type actuator, an eccentric rotating mass-type actuator, a piezo-type actuator, or a solenoid-type actuator, but the disclosure is not limited thereto.

In an embodiment of the disclosure, the number of actuators 1500 may be equal to the number of PWM signals. In a case in which a plurality of actuators 1500 are provided, the actuators may be arranged on the wearable device 1000 to be spaced a preset interval from each other. In order to provide haptic feedback to the user, the wearable device 1000 may include physical structures to adjust the position of the at least one actuator 1500 to be closer to or farther away from the user's body.

The display 1600 may visually provide information to the outside (e.g., the user) of the wearable device 1000. For example, the display 1600 may output a visual modality based on image data and text data. The display 1600 may include, for example, a hologram device, a projector, and/or a control circuit for controlling the display. In an embodiment of the disclosure, the display 1600 may include a touch sensor configured to detect a touch or a pressure sensor configured to measure the intensity of force generated by a touch.

The speaker 1700 may convert an electrical signal into a sound. For example, the speaker 1700 may output an auditory modality based on sound data. In an embodiment of the disclosure, the speaker 1700 may output a sound through an external electronic device directly or wirelessly connected to the wearable device 1000.

The memory 1800 may store data, which has been processed by or is to be processed by the processor 1900, firmware, software, process code, etc. In an embodiment of the disclosure, the memory 1800 may store image data, text data, or sound data.

In an embodiment of the disclosure, data and program code corresponding to at least one of a modality source identifier 1810, an unobtained modality source generator 1820, a PWM signal generator 1830, and an artificial intelligence module 1840 may be stored in the memory 1800. The configurations, functions, and operations of the modality source identifier 1810, the unobtained modality source generator 1820, and the PWM signal generator 1830 are similar to those of the modality source identifier 210, the unobtained modality source generator 220, and the PWM signal generator 230, and thus, redundant descriptions thereof are omitted. The artificial intelligence module 1840 may include at least some of the functions of the trained neural network 221 and/or the GAN 300. The artificial intelligence module 1840 may train an neural network (e.g., the GAN 300) by using a data set. The artificial intelligence module 1840 may output data by using the artificial intelligence model (e.g., the GAN 300).

The memory 1800 may be used as a main memory device of the wearable device 1000. For example, the memory 1800 may include at least one of a flash memory-type storage medium, a hard disk-type storage medium, a multimedia card micro-type storage medium, a card-type memory (e.g., an SD or XD memory), dynamic random-access memory (DRAM), static random-access memory (SRAM), phase-change random-access memory (PRAM), magnetic random-access memory (MRAM), ferroelectric random-access memory (FeRAM), resistive random-access (RRAM) memory), read-only memory (ROM), electrically erasable programmable ROM (EEPROM), programmable ROM (PROM), magnetic memory, a magnetic disk, or an optical disc. The memory 1800 may be referred to as buffer memory, working memory, or cache memory. Although not illustrated, one or more memories 1800 may be provided.

The processor 1900 may be electrically connected to components included in the wearable device 1000 to perform computations or data processing related to control and/or communication of the components included in the wearable device 1000. For example, the processor 1900 may include at least one of a central processing unit (CPU), an application processor (AP), a graphics processing unit (GPU), or a neural processing unit (NPU).

In an embodiment of the disclosure, the processor 1900 may load commands or data received from at least one of the other components into the memory 1600, then process the commands or data, and store resulting data in the memory 1800. For example, the processor 1900 may load, into the memory 1800, commands or data corresponding to the functions of the modality source identifier 1810, the unobtained modality source generator 1820, the PWM signal generator 1830, and the artificial intelligence module 1840, and then process the commands or data. Although not illustrated, one or more processors 1900 may be provided depending on a function or purpose. In this case, at least one processor may perform computations or data processing related to control and/or communication of the components included in the wearable device 1000, in a distributed manner. For example, the wearable device 1000 may further include a separate processor for executing the artificial intelligence module 1840, for example, an NPU.

In an embodiment of the disclosure, the processor 1900 may execute instructions to obtain modality source data. For example, the processor 1900 may execute instructions to obtain image data generated by the camera 1300. For example, the processor 1900 may execute instructions to obtain sound data corresponding to an audio signal generated by the microphone 1400. For example, the processor 1900 may execute instructions to obtain at least one of image data, text data, and sound data from an external device. For example, the processor 1900 may execute instructions to obtain at least one of image data, text data, and sound data stored in the memory 1800.

Figure 11A:
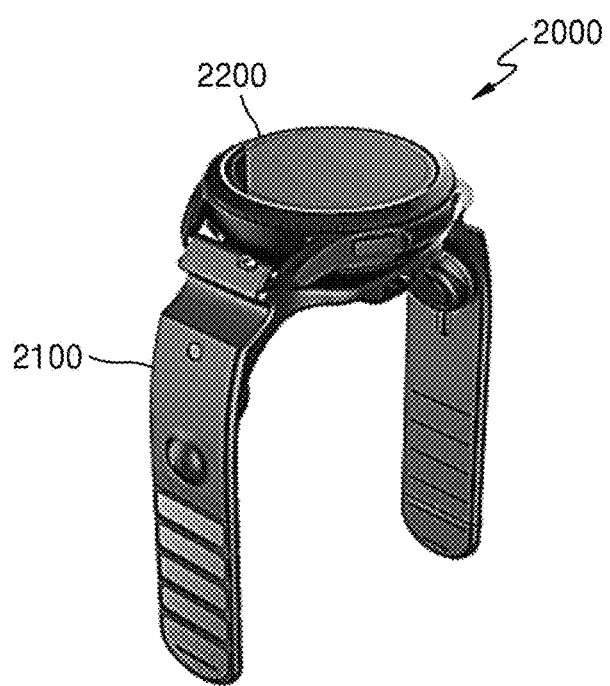
FIGS. 11A to 11C are diagrams illustrating a configuration of a wearable device according to an embodiment of the disclosure.
Figure 11B:
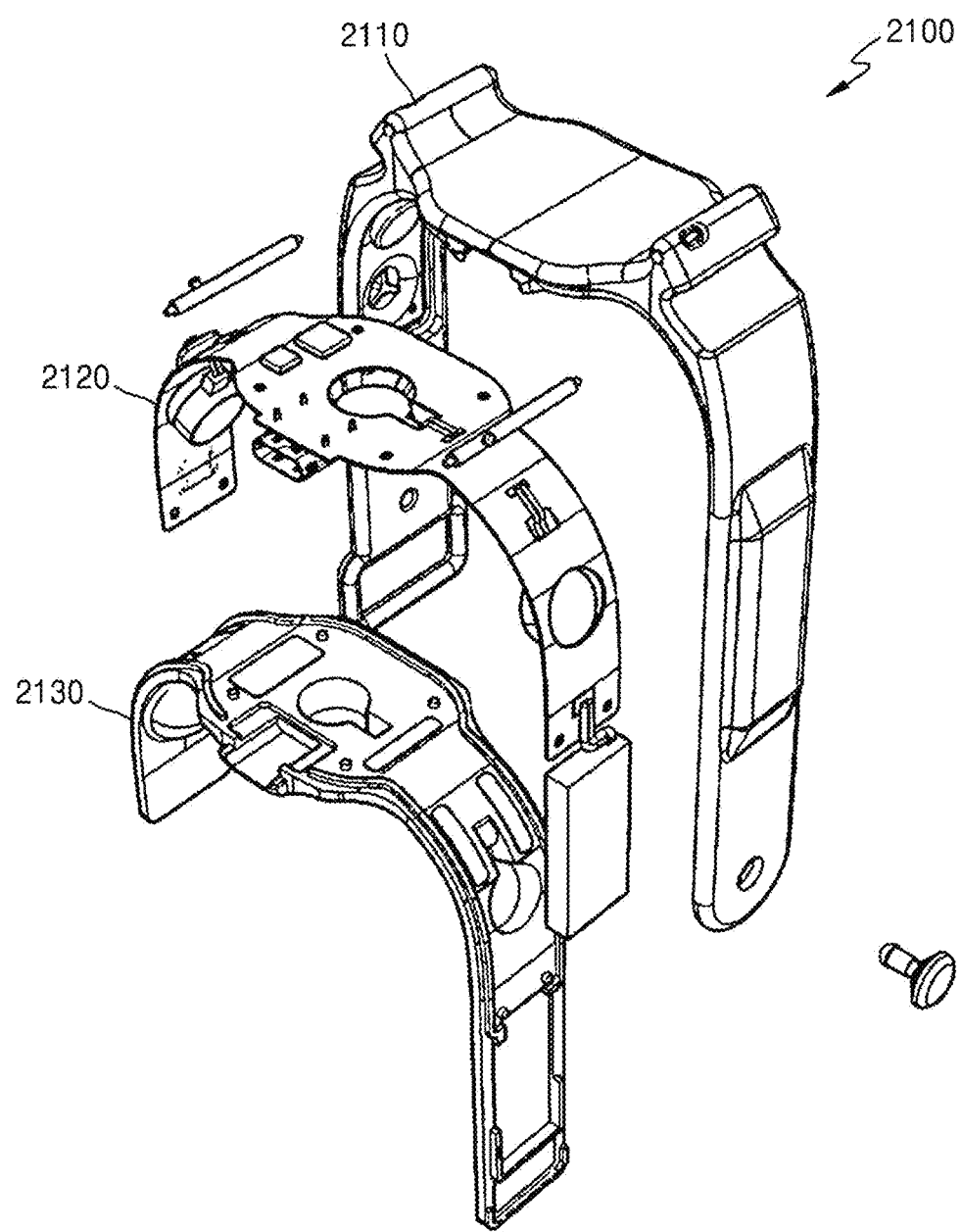
Figure 11C:
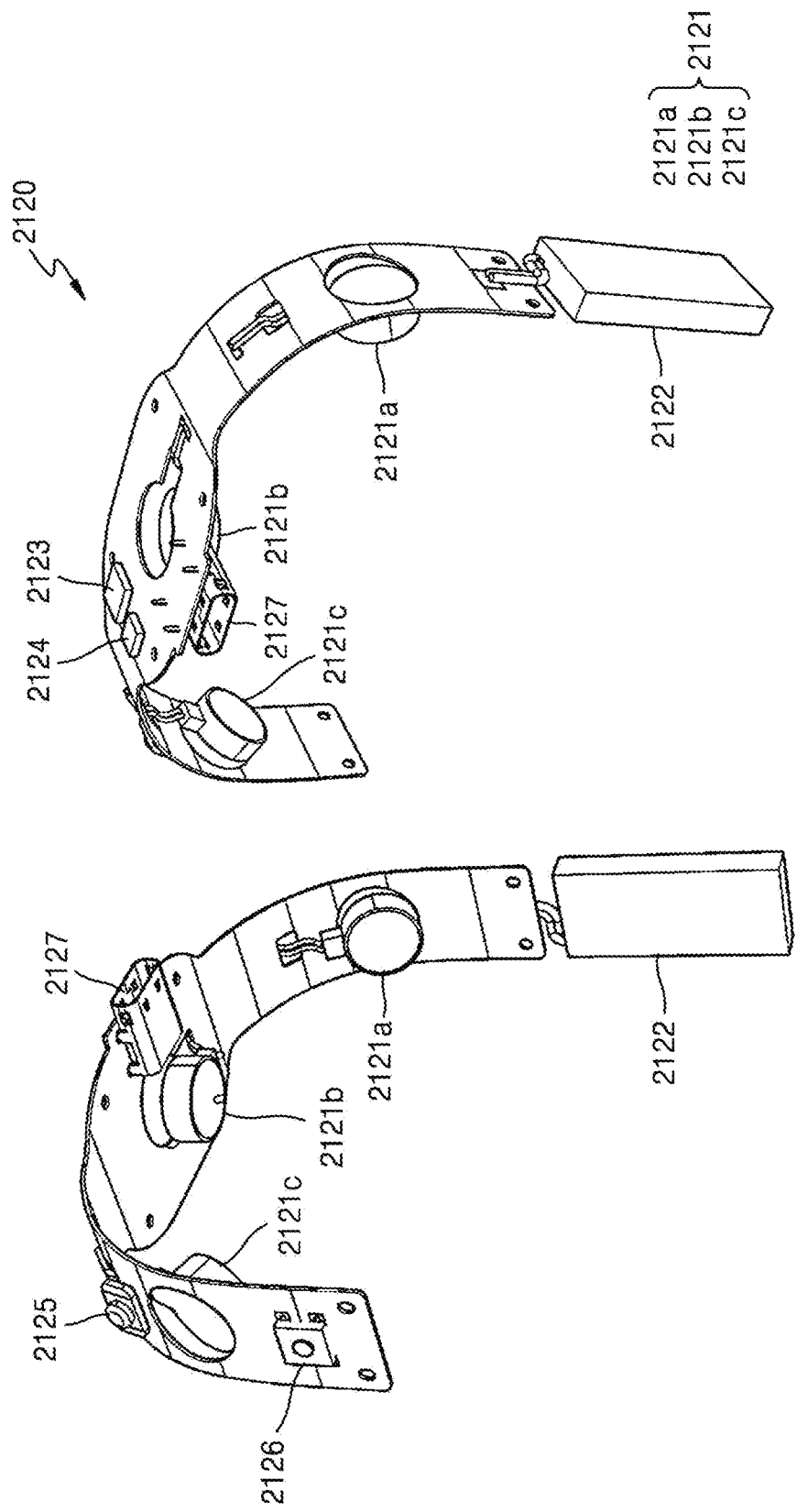

FIGS. 11A to 11C are diagrams illustrating a configuration of a wearable device according to an embodiment of the disclosure. In an embodiment of the disclosure, a wearable device 2000 may be a smart watch or a smart band. Although FIG. 11A illustrates an embodiment of the disclosure in which the wearable device 2000 is implemented as a smart watch, the disclosure is not limited thereto. The function and operation of the wearable device 2000 are similar to those of the wearable devices 100, 200, and 1000 described above with reference to FIGS. 1 to 10, and thus, redundant descriptions thereof are omitted.

Referring to FIG. 11A, a wearable device 2000 may include a wrist strap 2100 and a main body 2200. The wrist strap 2100 may be connected to the main body 2200 to be worn on a wrist of a user. In an embodiment of the disclosure, a display may be arranged on the upper surface of the main body 2200, but in a case in which the wearable device 2000 is implemented as a smart band, the display may be omitted.

Referring to FIG. 11B, the wrist strap 2100 may include an upper cover 2110, a substrate 2120, and a lower cover 2130. However, the disclosure is not limited thereto, and the upper cover 2110, the substrate 2120, and the lower cover 2130 may be integrally provided.

The substrate 2120 may be arranged between the upper cover 2110 and the lower cover 2130. With respect to the wrist of the user, the upper cover 2110 may be the outer surface, and the lower cover 2130 may be the inner surface.

The substrate 2120 may include a printed circuit board (PCB) and/or a flexible PCB (F-PCB). The substrate 2120 may include glass, plastic, an organic material, silicone, etc. For example, the substrate 2120 may include various circuit elements. The substrate 2120 may include wires electrically connecting the circuit elements to each other.

Referring to FIG. 11C, the substrate 2120 may include actuators 2121, a battery 2122, a processor 2123, a communication module 2124, a light-emitting diode (LED) module 2125, a switch unit 2126, and a port unit 2127. However, the disclosure is not limited thereto, and some components included in the substrate 2120 may be omitted.

The function and operation of the actuators 2121 are similar to those of the first to third actuators 410a, 410b, and 410c of FIGS. 4A and 4B and the at least one actuator 1500 of FIG. 10, and thus, redundant descriptions thereof are omitted. The actuators 2121 may include a first actuator 2121a, a second actuator 2121b, and a third actuator 2121c. Although FIG. 11C illustrates only three actuators 2121a, 2121b, and 2121c, the number of actuators is not limited thereto. The actuators 2121 may receive a PWM signal from the processor 2123 through a wire. The actuators 2121 may output a vibration signal based on the PWM signal.

In an embodiment of the disclosure, the first actuator 2121a may output a vibration signal based on a PWM signal corresponding to a first frequency. The second actuator 2121b may output a vibration signal based on a PWM signal corresponding to a second frequency. The third actuator 2121c may output a vibration signal based on a PWM signal corresponding to a third frequency. For example, the second frequency may be greater than the first frequency and lower than the third frequency. The first to third frequencies may be changed according to a setting by the manufacturer or a user, and an example of changes in them by a setting of the user will be described in detail with reference to FIGS. 12A to 12B.

The actuators 2121 may be arranged to be in direct or indirect contact with the user's skin (e.g., skin around the wrist). Although the actuators 2121 are illustrated as being circular, this is only an example, and the actuators 2121 may be implemented in various shapes. Although the actuators 2121 are illustrated as being spaced apart from each other at regular intervals, this is only an example, and the actuators 2121 may be arranged to be spaced apart from each other at different intervals.

The battery 2122 may supply power to components or circuit elements of the substrate. The battery 2122 may be arranged on one side of the substrate 2120, but the arrangement of the battery 2122 is not limited thereto. The battery 2122 may be electrically connected to the port unit 2127. For example, the port unit 2127 may be configured as a universal serial bus (USB) jack, but is not limited thereto. As an external power supply device is connected to the battery 2122 through the port unit 2127, the battery 2122 may be charged. Although not illustrated, a power management integrated circuit (PMIC) may be arranged on the substrate 2120. A power control device (not shown) may appropriately convert power received from the battery 2122 into a voltage, and transmit the voltage to the components (e.g., the actuators 2121, the processor 2123, the communication module 2124, etc.) on the substrate 2120.

The function and operation of the processor 2123 are similar to those of the processor 1900 of FIG. 10, and thus, redundant descriptions thereof are omitted. The processor 2123 may control the overall operation of the components of the substrate 2120. The processor 2123 may process various computations to operate the components of the substrate 2120. For example, the processor 2123 may generate a PWM signal based on data (e.g., sound data) obtained from the communication module 2124.

For example, the processor 2123 may control the actuators 2121 to output vibration signals based on the generated PWM signal or a PWM signal directly obtained from the communication module 2124. For example, the processor 2123 may be implemented as a microcontroller unit (MCU), a general-purpose processor, a dedicated processor, or an application processor.

The function and operation of the communication module 2124 are similar to those of the communication interface 1100 of FIG. 10, and thus, redundant descriptions thereof are omitted. For example, the communication module 2124 may be a Bluetooth module, but is not limited thereto. For example, the communication module 2124 may transmit received data to the processor 2123 through universal asynchronous receiver/transmitter (UART) communication, but the communication technique between the communication module 2124 and the processor 2123 is limited thereto.

The LED module 2125 may output light of a color (e.g., red (R), green (G), or blue (B)) according to an electrical signal (e.g., an LED enable signal). The LED module 2125 may output light related to the state of the wrist strap 2100 or light related to the operation of the wrist strap 2100. The switch unit 2126 may turn on/off the power of the substrate 2120. For example, the switch unit 2126 may be implemented as a tactile switch, but is not limited thereto. The port unit 2127 is for electrically connecting an external device to the substrate 2120. Through the port unit 2127, the battery 2122 may be charged or external data (e.g., sound data or a PWM signal) may be obtained.

According to an embodiment of the disclosure, as a tactile modality by a vibration signal is provided to the user wearing the wearable device 2000 together with a visual modality and an auditory modality provided from the wearable device 2000 or external device(s), multimedia immersion may be provided through the user's various senses.

Figure 12A:
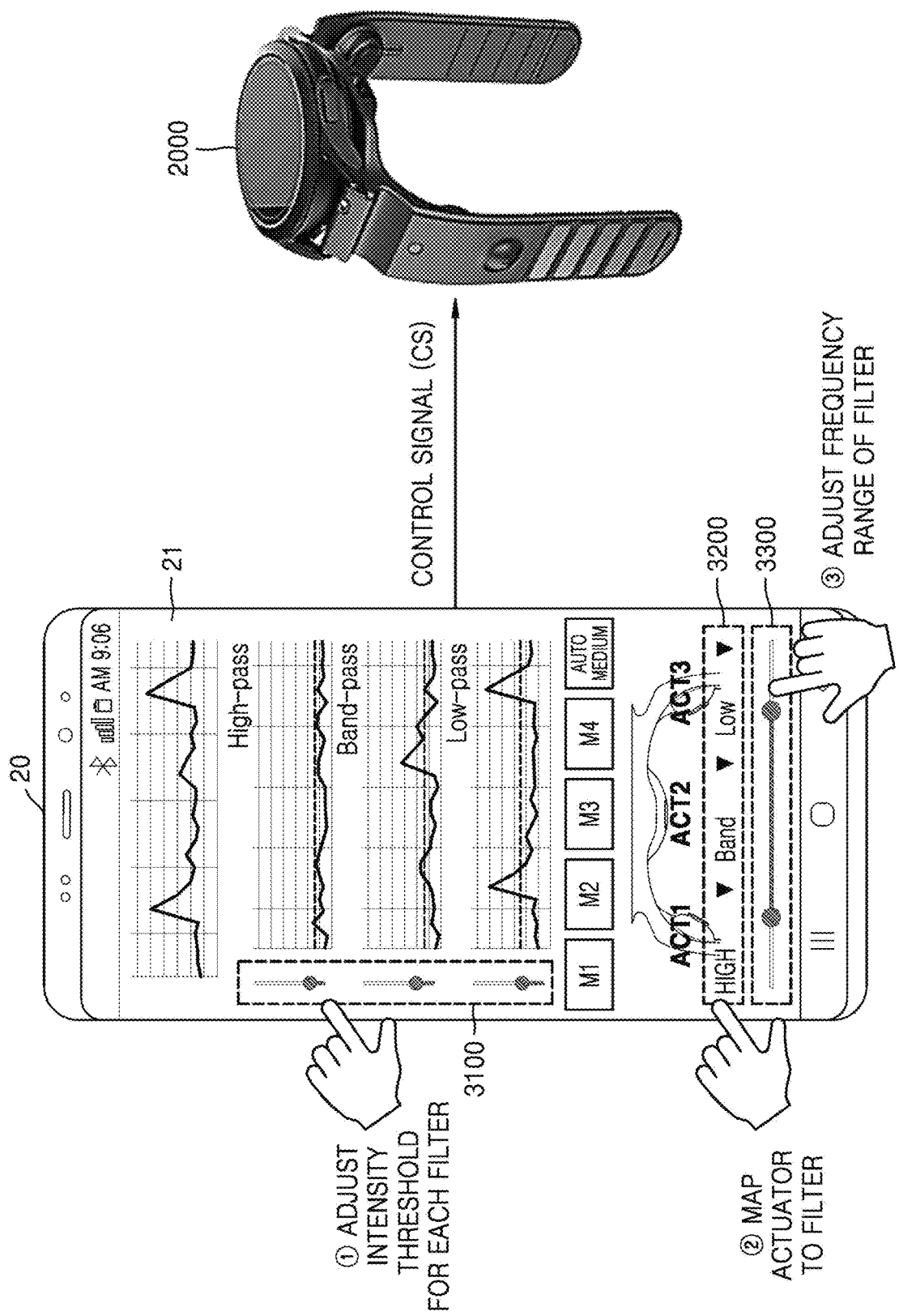
FIGS. 12A and 12B are diagrams illustrating a user interface for controlling an operation of a wearable device, according to an embodiment of the disclosure.
Figure 12B:
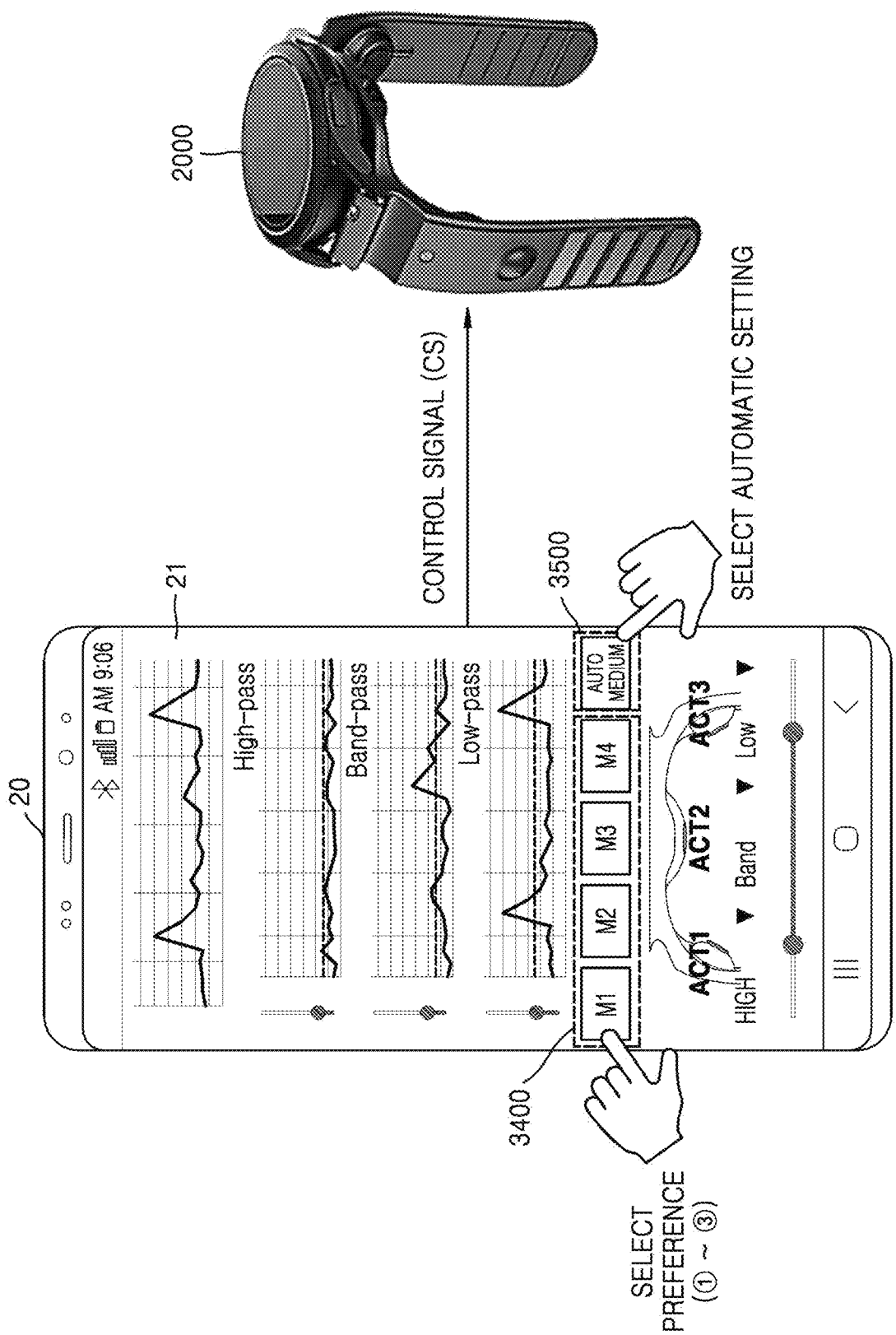

FIGS. 12A and 12B are diagrams illustrating a user interface for controlling an operation of a wearable device, according to an embodiment of the disclosure. The operation and function of the wearable device 2000 of FIGS. 12A and 12B correspond to those of the wearable devices 100, 200, 1000, and 2000 of FIGS. 1 to 11C, and thus, redundant descriptions thereof are omitted. For convenience of description, descriptions will be provided with reference to FIGS. 4A to 5 and FIGS. 11A to 11C.

A user interface providing device 20 according to an embodiment of the disclosure may be implemented in various forms. For example, the user interface providing device 20 may be a mobile terminal, but the disclosure is not limited thereto, and the user interface providing device 20 may be any electronic device including a display (e.g., a television (TV), a refrigerator, a computer, etc.). In addition, the mobile terminal may be, but is not limited to, a smart phone, a laptop computer, a tablet personal computer (PC), a digital camera, an electronic book terminal, a digital broadcasting terminal, a personal digital assistant (PDA), a portable multimedia player (PMP), a navigation system, an MP3 player, or the like. For example, the mobile terminal may include a wearable device that may be worn by the user.

The user interface providing device 20 may transmit and receive information by directly or indirectly communicating with the wearable device 2000. In an embodiment of the disclosure, the user interface providing device 20 may transmit and receive information to and from the wearable device 2000 through a server device (not shown). In an embodiment of the disclosure, the user interface providing device 20 may transmit and receive information to and from the wearable device 2000 through a wireless communication channel, such as Bluetooth or Wi-Fi.

The user interface providing device 20 may provide the user with a user interface for controlling the wearable device 2000. The user interface providing device 20 may include a display 21. The display 21 may display the user interface for controlling the wearable device 2000. The user interface may be provided through a particular application (e.g., a wearable device management application) installed in the user interface providing device 20.

Referring to FIG. 12A, the user interface providing device 20 may provide a user interface including an intensity threshold slider 3100, an actuator-filter mapping button 3200, and a frequency range slider 3300.

Visualized data corresponding to sub-sound data filtered based on at least one filter may be displayed on the user interface. Although FIG. 12A illustrates three visualized data corresponding to three pieces of sub-sound data filtered based on an LPF, a BPF, and an HPF, the disclosure is not limited thereto. Accordingly, pieces of visualized data as many as the number of multi-channels may be displayed. For convenience of description, hereinafter, an example will be described in which filters including an LPF, a BPF, and an HPF are used.

The intensity threshold slider 3100 for adjusting the intensity threshold of sub-sound data may be displayed on the user interface. The user may adjust the intensity threshold of the sub-sound data by using the intensity threshold slider 3100. Here, the intensity threshold refers to the minimum intensity value of a signal for an actuator to output a vibration signal. Accordingly, in a case in which a signal corresponding to the sub-sound data has an intensity value less than the intensity threshold, the actuator may not output a vibration signal. In a case in which the signal corresponding to the sub-sound data has an intensity value greater than or equal to the intensity threshold, the actuator may output a vibration signal corresponding to the intensity value. The user may set an intensity threshold corresponding to each of the LPF, the BPF, and the HPF by using the intensity threshold slider 3100.

Pieces of visualized data corresponding to the actuators 2121 of the wearable device 2000 may be displayed on the user interface. Although FIG. 12A illustrates that three pieces of visualized data corresponding to the three actuators 2121a, 2121b, and 2121c are displayed, the disclosure is not limited thereto. Thus, pieces of visualized data as many as the number of actuators 2121 may be displayed. For convenience of description, hereinafter, an example will be described in which filters including an LPF, a BPF, and an HPF are used.

The actuator-filter mapping button 3200 for mapping the actuators to the filters may be displayed on the user interface. The user may map the actuators to the filters by using the actuator-filter mapping button 3200. Each of the first to third actuators 2121a, 2121b, and 2121c may be mapped to one of the LPF, the BPF, and the HPF. For example, the first actuator 2121a may be mapped to the HPF, the second actuator 2121b may be mapped to the BPF, and the third actuator 2121c may be mapped to the LPF. For example, all of the first to third actuators 2121a, 2121b, and 2121c may be mapped to the LPF. In an embodiment of the disclosure, at least one of the first to third actuators 2121a, 2121b, and 2121c may not be mapped to any filter.

The frequency range slider 3300 for adjusting frequency ranges of filters may be displayed on the user interface. The user may adjust the frequency range of each filter by using the frequency range slider 3300. For convenience of description, hereinafter, an example will be described in which filters including an LPF, a BPF, and an HPF are used.

In an embodiment of the disclosure, the user may set the frequency range of the BPF by using the frequency range slider 3300. The frequency range of the BPF may be set to include frequencies between a first cutoff frequency and a second cutoff frequency. The frequency range of the LPF may be set to include frequencies less than the first cutoff frequency of the BPF, and the frequency range of the HPF may be set to include frequencies greater than the second cutoff frequency of the BPF. Accordingly, the frequency ranges of the LPF, the BPF, and the HPF may be linear.

In an embodiment of the disclosure, the frequency range of each of the LPF, the BPF, and the HPF may be set by using the frequency range slider 3300. In this case, the frequency ranges of the LPF, the BPF, and the HPF may overlap each other, or there may be a frequency range that is not covered by the frequency ranges of the LPF, the BPF, and the HPF. Accordingly, the frequency ranges of the LPF, the BPF, and the HPF may be nonlinear.

Referring to FIG. 12B, the user interface providing device 20 may provide a user interface including a preference button 3400 and an automatic setting button 3500.

The preference button 3400 for saving or loading a setting previously set by the user may be displayed on the user interface. A plurality of preference buttons 3400 may be provided. The user may use the preference button 3400 to save or load operational attributes of the wearable device 2000 that are set through the intensity threshold slider 3100, the actuator-filter mapping button 3200, and the frequency range slider 3300.

The automatic setting button 3500 for automatically setting an intensity threshold corresponding to sub-sound data, mapping information between actuators and filters, frequency ranges of filters, etc. (i.e., operational attributes of the wearable device 2000) may be displayed on the user interface. For example, the operational attributes of the wearable device 2000 that are set by the automatic setting button 3500 may be determined in advance. For example, the operational attributes of the wearable device 2000 that are set by the automatic setting button 3500 may be determined based on the attributes of multimedia data and the type of application (e.g., a music playback application, a video playback application, a game application, a social networking service (SNS) application, an information search application, a call application, a message application, etc.). According to an embodiment of the disclosure, the wearable device 2000 (or a processor of the wearable device 2000) may identify the attributes of multimedia data or the type of an application. For example, in a case in which sound data is classified as blast sound data in a game or a movie, the operational attributes of the wearable device 2000 may be determined to enable the actuators to output strong vibration signals. The user may change the operational attributes of the wearable device 2000 by using the preference button 3400.

In an embodiment of the disclosure, the user interface providing device 20 may transmit a control signal CS to the wearable device 2000. In an embodiment of the disclosure, the user interface providing device 20 may transmit the control signal CS to the wearable device 2000 through a server device (not shown). For example, the control signal CS may include information for controlling the operational attributes of the wearable device 2000. The wearable device 2000 may receive the control signal CS. In the specification, the control signal CS may be described as including data corresponding to a user input. Accordingly, the wearable device 2000 may adjust a PWM signal based on a user input.

In an embodiment of the disclosure, the operation, performed by the wearable device, of receiving a user input described above with reference to FIG. 5 corresponds to the operation, performed by the wearable device, of receiving the control signal CS described above with reference to FIGS. 12A and 12B, and it goes without saying that the embodiments of the disclosure regarding obtaining (or receiving) a user input described above with reference to FIGS. 5, 12A, and 12B may be combined with each other.

According to an embodiment of the disclosure, by providing a personalized haptic feedback control function through a user interface, a tactile modality may be provided considering attributes of multimedia data (e.g., a music, a movie, or a game), the user's haptic sensitivity and acceptability, etc.

According to an embodiment of the disclosure, by providing a personalized haptic feedback control function through a user interface, an impact point desired by the user among various attributes of multimedia data may be emphasized.

Figure 13A:
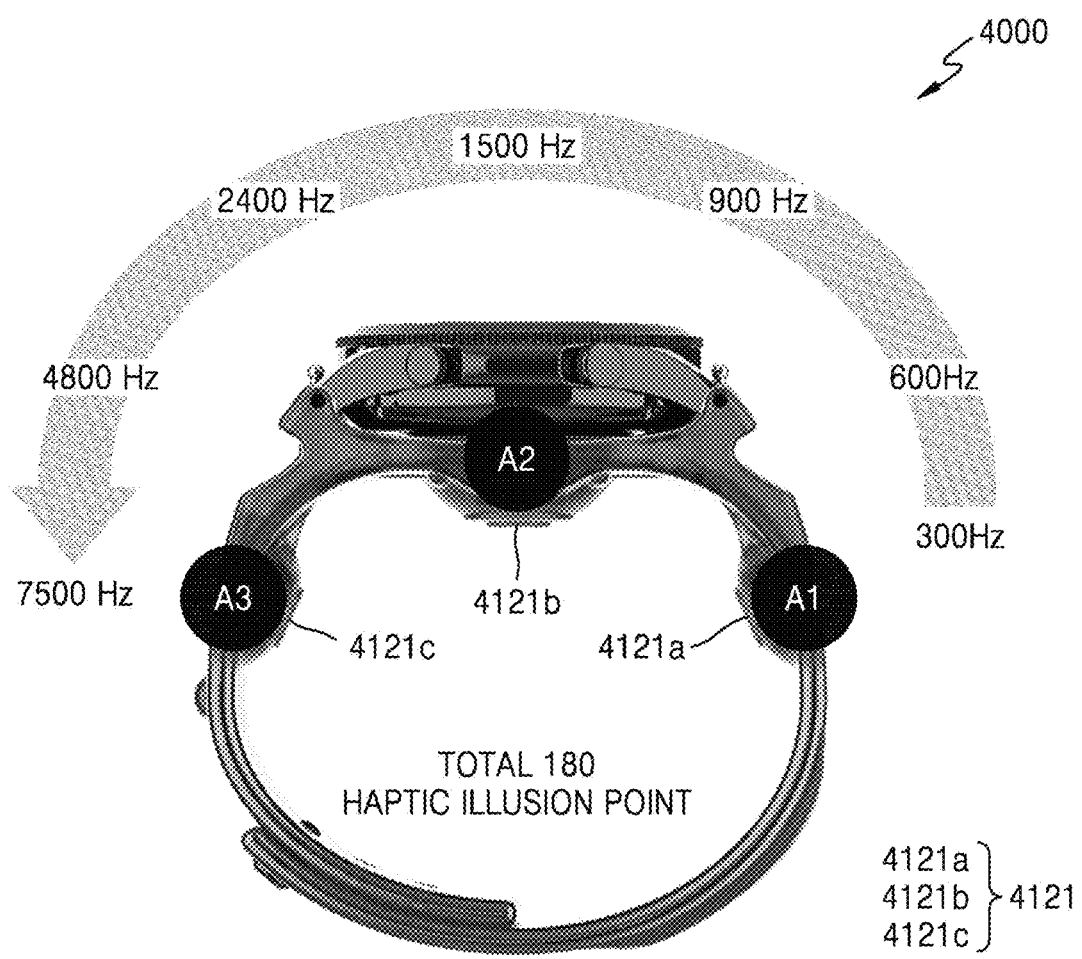
FIGS. 13A and 13B are conceptual diagrams for describing a haptic illusion effect according to an embodiment of the disclosure.
Figure 13B:
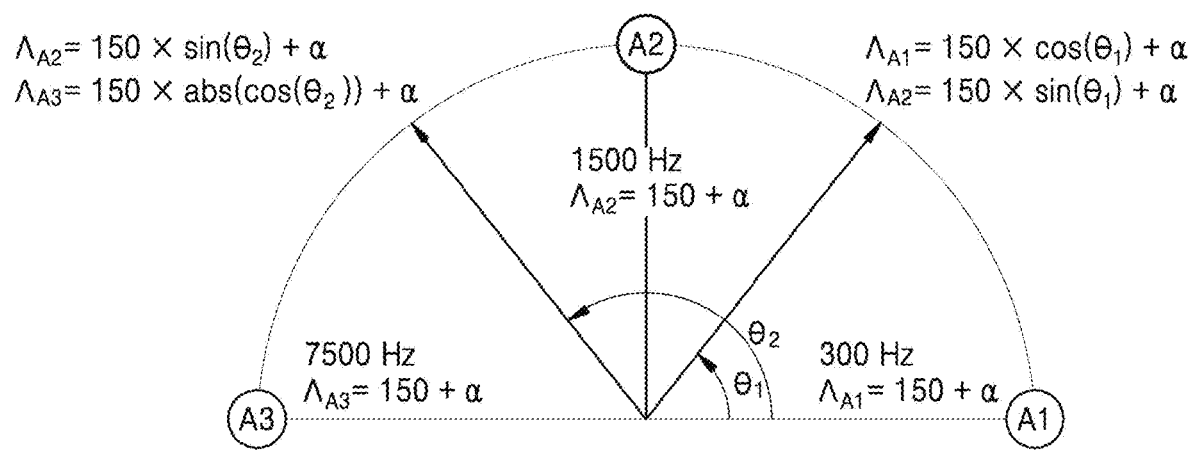

FIGS. 13A and 13B are conceptual diagrams for describing a haptic illusion effect according to an embodiment of the disclosure.

The operation and function of a wearable device 4000 of FIGS. 13A and 13B correspond to those of the wearable devices 100, 200, 1000, and 2000 of FIGS. 1 to 11C, and thus, redundant descriptions thereof are omitted.

The wearable device 4000 may include at least two actuators. Although it is assumed that the wearable device 4000 includes three actuators 4121a, 4121b, and 4121c for convenience of description, but the disclosure is not limited thereto. According to an embodiment of the disclosure, the wearable device 4000 may provide haptic feedback corresponding to a haptic illusion point by using the at least two actuators. In the specification, the haptic illusion point may refer to a virtual point between one actuator and another actuator. For example, the haptic illusion point may be on a skin contact surface of a wrist strap of the wearable device 4000. According to an embodiment of the disclosure, as the haptic illusion point is generated, a haptic feedback effect as if an actuator exists at a point where no actuator exists may be provided to the user. According to an embodiment of the disclosure, as a haptic illusion point is generated, a vibration sensation as if continuously moving from one point to another point may be delivered to the user.

In an embodiment of the disclosure, the shape of the wrist strap when the user wears the wearable device 4000 may be approximated to a circular shape. In this case, actuators 4121 may be arranged on the wrist strap at regular intervals. Accordingly, the point of each of the actuators 4121 may be represented by only an angle in a polar coordinate system. For example, the point of the first actuator may be expressed as 0°, the point of the second actuator may be expressed as 90°, and the point of the third actuator may be expressed as 180°. The points of the actuators 4121 are not limited thereto, and for convenience of description, the above-described example is assumed and described below.

In an embodiment of the disclosure, the frequencies of pieces of sound data respectively corresponding to the actuators 4121a, 4121b, and 4121c may be different from each other. Although FIG. 13A illustrates that the frequency range of the actuators 4121a, 4121b, and 4121c or pieces of sound data corresponding to haptic illusion points is 300 Hz to 7500 Hz, but the frequency range is not limited thereto, and the frequency range may be changed according to a setting by the manufacturer or the user. In an embodiment of the disclosure, the frequencies of pieces of sound data respectively corresponding to the actuators 4121a, 4121b, and 4121c may be determined based on various functions (e.g., a linear function, a logarithmic function, etc.). Hereinafter, it is assumed that the frequencies of actuators and sound data correspond to each other by a logarithmic function as illustrated in FIG. 13A, but the disclosure is not limited thereto. For example, the frequency corresponding to the first actuator 4121a may be a first frequency (e.g., 300 Hz), the frequency corresponding to the second actuator 4121b may be a second frequency (e.g., 1500 Hz), and the frequency corresponding to the third actuator 4121c may be a third frequency (e.g., 7500 Hz). Accordingly, in a case in which the frequency of the sound data is the first frequency (e.g., 300 Hz), the first actuator 4121a may operate based on a PWM signal. In a case in which the frequency of the sound data is the second frequency (e.g., 1500 Hz), the second actuator 4121b may operate based on a PWM signal. In a case in which the frequency of the sound data is the third frequency (e.g., 7500 Hz), the third actuator 4121c may operate based on the PWM signal. For example, the first frequency may be lower than the second frequency, and the second frequency may be lower than the third frequency. The first to third frequencies may be previously determined or changed according to a settings by the user or the manufacturer.

For frequencies other than the frequency of the sound data corresponding to the first to third actuators 4121a, 4121b, and 4121c (i.e., frequencies greater than the first frequency and less than the third frequency), two of the first to third actuators 4121a, 4121b, and 4121c may operate based on PWM signals. For example, in a case in which the frequency of the sound data is greater than the first frequency (e.g., 300 Hz) and lower than the second frequency (e.g., 1500 Hz), the first actuator 4121a and the second actuator 4121b may operate based on PWM signals. For example, in a case in which the frequency of the sound data is greater than the second frequency (e.g., 1500 Hz) and lower than the third frequency (e.g., 7500 Hz), the second actuator 4121b and the third actuator 4121c may operate based on PWM signals.

The wearable device 4000 may identify a haptic illusion point (e.g., 45°) corresponding to the frequency of the sound data (e.g., 671 Hz). The haptic illusion point may exist between the points where two actuators to be operated (e.g., the first actuator 4121a and the second actuator 4121b) exist. For example, the haptic illusion point (e.g., 45°) corresponding to the frequency (e.g., 671 Hz) of the sound data may be determined by a logarithmic function determined by the frequencies (e.g., 300 Hz and 1500 Hz) corresponding to two actuators (e.g., the first actuator 4121a and the second actuator 4121b). The wearable device 4000 may determine at least two actuators (e.g., the first actuator 4121a and the second actuator 4121b) to be operated, based on the haptic illusion point.

Referring to FIG. 13B, in a case in which two actuators (e.g., the first actuator 4121a and the second actuator 4121b) operate based on a PWM signal, the duty cycles of the PWM signals respectively input to the two actuators (e.g., the first actuator 4121a and the second actuator 4121b) may be different from each other. The wearable device 4000 may determine the duty cycle of a PWM signal input to each of the two actuators (e.g., the first actuator 4121a and the second actuator 4121b). The duty cycle of the PWM signal input to each of the two actuators (e.g., the first actuator 4121a and the second actuator 4121b) may be determined by using a trigonometric function.

$$\Lambda_{A1} = \Lambda_{min} \times \cos(\theta_1) + \alpha$$

$$\Lambda_{A2} = \Lambda_{min} \times \sin(\theta_1) + \alpha \quad \text{[Equation 1]}$$

$$\Lambda_{A2} = \Lambda_{min} \times \sin(\theta_2) + \alpha$$

$$\Lambda_{A3} = \Lambda_{min} \times \text{abs}(\cos(\theta_2)) + \alpha \quad \text{[Equation 2]}$$

Equation 1 is for determining the duty cycle of a PWM signal for a haptic illusion point existing between the first actuator 4121a and the second actuator 4121b, according to an embodiment of the disclosure. Equation 2 is for determining the duty cycle of a PWM signal for a haptic illusion point existing between the second actuator 4121b and the third actuator 4121c, according to an embodiment of the disclosure. Referring to Equations 1 and 2, $\Lambda_{min}$ is defined as the minimum duty cycle corresponding to an intensity threshold of the sound data, $\Lambda_{A1}$ is defined as the duty cycle of the PWM signal input to the first actuator 4121a, $\Lambda_{A2}$ is defined as the duty cycle of the PWM signal input to the second actuator 4121b, and $\Lambda_{A3}$ is defined as the duty cycle of the PWM signal input to the third actuator 4121c, $\alpha$ is defined as a duty cycle mapped to the sound energy intensity of the sound data, $\theta_1$ is defined as a haptic illusion point existing between the first actuator 4121a and the second actuator 4121b, and $\theta_2$ is defined as a haptic illusion point existing between the second actuator 4121b and the third actuator 4121c. For example, when $\Lambda_{min}$ is 150 and the frequency of the sound data is 671 Hz, $\theta_1$ is 45°, and $\Lambda_{A1}$ and $\Lambda_{A2}$ are 106+α, respectively.

Although FIGS. 13A and 13B illustrate that the actuators 4121 correspond to (or are mapped to) the frequency of the sound data, but the disclosure is not limited thereto. Thus, the actuators 4121 may correspond to any attribute of the sound data (e.g., frequency, sound energy intensity (dB), spectrum, etc.), and the duty cycles of the PWM signals input to the actuators may also be set to correspond to the attribute.

In an embodiment of the disclosure, an operation method of a wearable device may include obtaining source data including at least one of image data, text data, or sound data. The operation method of the wearable device may further include determining whether the image data, the text data, and the sound data are included in the source data. The operation method of the wearable device may further include, based on determining that at least one of the image data, the text data, or the sound data is not included in the source data, generating the image data, the text data, and the sound data, which are not included in the source data, by using a generator of a GAN, which receives the source data as an input. The operation method of the wearable device may further include generating a PWM signal based on the sound data. The operation method of the wearable device may further include outputting the multi-modality based on the image data, the text data, the sound data, and the PWM signal.

In an embodiment of the disclosure, the multi-modality may include a visual modality, an auditory modality, and a tactile modality.

In an embodiment of the disclosure, the generating of the PWM signal may include filtering the sound data into at least one piece of sub-sound data according to a frequency component of the sound data by using at least one filter that receives the sound data as an input. The generating of the PWM signal may further include obtaining a sound feature based on the at least one piece of sub-sound data. The generating of the PWM signal may further include identifying whether a variance of the sound feature is greater than a threshold. The generating of the PWM signal may further include, based on identifying that the variance of the sound feature is greater than the threshold, filtering the sound feature based on sound energy intensity of the at least one piece of sub-sound data and a sound energy gradient of the at least one piece of sub-sound data. The generating of the PWM signal may further include generating the PWM signal by mapping the sound energy intensity with a duty cycle of the at least one piece of sub-sound data corresponding to the sound feature.

In an embodiment of the disclosure, the obtaining of the sound feature may include extracting a plurality of sound features based on the at least one piece of sub-sound data. The obtaining of the sound feature may further include calculating a correlation between the plurality of sound features and a variance of the plurality of sound features. The obtaining of the sound feature may further include selecting a representative sound feature based on the correlation and the variance. The representative sound feature may be the sound feature.

In an embodiment of the disclosure, the filtering of the sound feature may include normalizing the at least one piece of sub-sound data. The filtering of the sound feature may further include extracting, from the sound feature, a section in which the sound energy intensity is greater than an intensity threshold, and a section in which the sound energy intensity is not greater than the intensity threshold. The filtering of the sound feature may further include extracting, from the sound feature, a section in which the sound energy gradient is greater than a gradient threshold, and a section in which the sound energy gradient is not greater than the gradient threshold. The filtering of the sound feature may further include passing a section of the sound feature in which the sound energy intensity is greater than the intensity threshold and the sound energy gradient is greater than the gradient threshold, and attenuating a section of the sound feature in which the sound energy intensity is not greater than the intensity threshold and/or the sound energy gradient is not greater than the gradient threshold.

In an embodiment of the disclosure, the sound feature may include at least one of sound energy, a frequency, a pitch, or intensity.

In an embodiment of the disclosure, the operation method of the wearable device may further include transmitting the PWM signal corresponding to the at least one piece of sub-sound data to an actuator corresponding to the PWM signal. For example, the operation method of the wearable device may further include transmitting, to a first actuator, a first PWM signal corresponding to first sub-sound data, and transmitting, to a second actuator, a second PWM signal corresponding to second sub-sound data.

In an embodiment of the disclosure, the generating of the PWM signal may include obtaining user speech characteristics from user metadata (or a user metadata DB). The generating of the PWM signal may further include adjusting the PWM signal based on the user speech characteristics.

In an embodiment of the disclosure, the generating of the PWM signal may include obtaining an user input from user metadata (or a user metadata DB). The generating of the PWM signal may further include adjusting the PWM signal based on the user input.

In an embodiment of the disclosure, the generating of the PWM signal may further include obtaining a sound feature based on sound data. The generating of the PWM signal may further include generating the PWM signal by mapping the sound energy intensity with a duty cycle of the sound data corresponding to the sound feature. The generating of the PWM signal may further include transmitting, to a first actuator, a signal corresponding to a partial area of the PWM signal in which the duty cycle is greater than a preset value, and transmitting, to a second actuator, a signal corresponding to an entire area of the PWM signal.

In an embodiment of the disclosure, the neural network may be a generator of a GAN. The GAN may perform obtaining training source data that does not include at least one of the image data, the text data, or the sound data. The GAN may further perform generating, by using a generator, which receives the training source data as an input, virtual data corresponding to at least one of the image data, the text data, or the sound data, which is not included in the training source data. The GAN may further perform determining, by using a discriminator that receives the virtual data and real data corresponding to the virtual data as an input, whether the virtual data and the real data are real. The GAN may further perform training the generator and the discriminator based on a result of the determining.

In an embodiment of the disclosure, generating the PWM signal may include identifying a haptic illusion point corresponding to a frequency of the sound data. Generating the PWM signal may include determining at least two actuators to operate based on the haptic illusion point. Generating the PWM signal may include determining a duty cycle of a PWM signal input to each of the determined at least two actuators.

In an embodiment of the disclosure, at least one filter may include first to third filters.

In an embodiment of the disclosure, the first filter may generate first sub-sound data based on sound data. The second filter may generate second sub-sound data based on the sound data. The third filter may generate third sub-sound data based on the sound data.

In an embodiment of the disclosure, a method of operating a wearable device includes generating a first PWM signal based on the first sub-sound data, generating a second PWM signal based on the second sub-sound data, and generating a third PWM signal based on the third sub-sound data.

In an embodiment of the disclosure, the user input may include intensity threshold values corresponding to the first to third sub-sound data.

In an embodiment of the disclosure, generating the PWM signal may include adjusting the PWM signal based on the intensity threshold.

In an embodiment of the disclosure, the user input may include mapping information between the first to third filters and the first to third actuators.

In an embodiment of the disclosure, the operating method of the wearable device may include transmitting the first to third PWM signals to at least one of the first to third actuators based on the mapping information.

In an embodiment of the disclosure, the user input may include information corresponding to a frequency range of each of the first to third filters.

In an embodiment of the disclosure, generating the PWM signal may include adjusting the PWM signal based on the information corresponding to the frequency range.

In an embodiment of the disclosure, the neural network may include a plurality of neural networks. Each of the plurality of neural networks may be a neural network that receives at least one of image data, text data, and sound data as input and outputs at least one of image data, text data, and sound data. Inputs and outputs of the plurality of neural networks may be different.

In an embodiment of the disclosure, various embodiments of the disclosure of the method of operating a wearable device described above may be provided in the form of a computer-readable recording medium having recorded thereon a program to be executed on a computer.

In an embodiment of the disclosure, a wearable device may include a display. The wearable device may include a speaker. The wearable device may include at least one actuator. The wearable device may include a memory storing one or more instructions. The wearable device may include at least one processor configured to execute the one or more instructions stored in the memory. The at least one processor may be further configured to execute the one or more instructions to obtain source data including at least one of image data, text data, or sound data. The at least one processor may be further configured to execute the one or more instructions to obtain source data including at least one of image data, text data, or sound data. The at least one processor may be configured to execute the one or more instructions to determine whether the image data, the text data, and the sound data are included in the source data. The at least one processor may be further configured to, based on determining that at least one of the image data, the text data, or the sound data is not included in the source data, generate the image data, the text data, and the sound data, which are not included in the source data, by using a generator of a GAN, which receives the source data as an input. The at least one processor may be further configured to generate a PWM signal based on the sound data. The at least one processor may be further configured to control the display, the speaker, and the at least one actuator to output the multi-modality based on the image data, the text data, the sound data, and the PWM signal.

In an embodiment of the disclosure, the at least one processor may control the display to output a visual modality based on the image data and the text data. The at least one processor may control the speaker to output an auditory modality based on the sound data. The at least one processor may control the at least one actuator to output a tactile modality.

In an embodiment of the disclosure, the at least one processor may be further configured to execute the one or more instructions to, in the generating of the PWM signal, obtain a sound feature based on the sound data, generate the PWM signal by mapping sound energy intensity and a duty cycle of the sound data corresponding to the sound feature, and transmit, to a first actuator of the at least one actuator, a signal corresponding to a partial area of the PWM signal in which the duty cycle is greater than a preset value, and transmit, to a second actuator of the at least one actuator, a signal corresponding to an entire area of the PWM signal.

In an embodiment, a method for providing a multi-modality on a wearable electronic device may include receiving, at the wearable electronic device, source data comprising one of image data, text data, and sound data. The method may include, in response to receiving the source data, generating first simulated data and second simulated data. When the source data comprises image data, the first simulated data and the second simulated data respectively comprise simulated text data and simulated sound data. When the source data comprises text data, the first simulated data and the second simulated data respectively comprise simulated image data and simulated sound data. When the source data comprises sound data, the first simulated data and the second simulated data respectively comprise simulated image data and simulated text data. The method may include generating a pulse-width modulation (PWM) signal based on the sound data or the simulated sound data. The method may include outputting the multi-modality based on the source data, the first simulated data, the second simulated data, and the PWM signal.

In an embodiment, the generating the first simulated data and the second simulated data may be generated by a machine learning model.

In an embodiment, the machine learning model may be a generative adversarial network (GAN).

A machine-readable storage medium (or recording medium) may be provided in the form of a non-transitory storage medium. Here, the term 'non-transitory storage medium' refers to a tangible device and does not include a signal (e.g., an electromagnetic wave), and the term 'non-transitory storage medium' does not distinguish between a case where data is stored in a storage medium semi-permanently and a case where data is stored temporarily. For example, the non-transitory storage medium may include a buffer in which data is temporarily stored.

According to an embodiment of the disclosure, the method according to various embodiments disclosed herein may be included in a computer program product and provided. The computer program product may be traded between a seller and a purchaser as a commodity. The computer program product may be distributed in the form of a machine-readable storage medium (e.g., a compact disc-ROM (CD-ROM)), or may be distributed online (e.g., downloaded or uploaded) through an application store or directly between two user devices (e.g., smart phones). In a case of online distribution, at least a portion of the computer program product (e.g., a downloadable app) may be temporarily stored in a machine-readable storage medium such as a manufacturer's server, an application store's server, or a memory of a relay server.

The computer program product may include a storage medium of a server or a storage medium of a client device, in a system consisting of the server and the client device. Alternatively, when there is a third device (e.g., a smart phone) communicatively connected to the server or the client device, the computer program product may include a storage medium of the third device. Alternatively, the computer program product may include a software program, which is transmitted from the server to the client device or the third device or transmitted from the third device to the client device.

In this case, one of the server, the client device, and the third device may execute the computer program product to perform the method according to the embodiments of the disclosure. Alternatively, two or more of the server, the client device, and the third device may execute the computer program product to execute the method according to the embodiments of the disclosure in a distributed manner.

Although embodiments have been described above in detail, the scope of the disclosure is not limited thereto, and various modifications and alterations by one of ordinary skill in the art using the basic concept of the disclosure defined in the following claims also fall within the scope of the disclosure.

The invention claimed is:

1. A method of a wearable device for providing a multi-modality, the method comprising:
   obtaining source data including at least one of image data, text data, or sound data;
   determining whether the image data, the text data, and the sound data are included in the source data;
   based on determining that at least one of the image data, the text data, or the sound data is not included in the source data, generating the image data, the text data, and the sound data, which are not included in the source data, by using a neural network, which receives the source data as input;

generating a plurality of pulse-width modulation (PWM) signals, based on the sound data; and outputting the multi-modality based on the image data, the text data, the sound data, and the plurality of PWM signals, wherein the generating the plurality of PWM signals comprises:

filtering the sound data into first and second sub-sound data according to a frequency component of the sound data by using first and second filters that receive the sound data as input, wherein the first sub-sound data corresponds to the first filter and the second sub-sound data corresponds to the second filter;

obtaining a first sound feature based on the first sub-sound data and a second sound feature based on the second sub-sound data;

identifying whether each variance of the first and the second sound features are greater than a threshold; and based on identifying whether each variance of the first and the second sound features is greater than the threshold, generating a first PWM signal corresponding to the first sub-sound data and a second PWM signal corresponding to the second sub-sound data.

2. The method of claim 1, wherein the generating the plurality of PWM signals further comprises:

based on identifying that the variance of the first sound feature is greater than the threshold:

filtering the first sound feature based on sound energy intensity of the first sub-sound data and a sound energy gradient of the first sub-sound data; and generating the first PWM signal by mapping the sound energy intensity of the first sub-sound data corresponding to the filtered first sound feature with a duty cycle of the first PWM signal, and based on identifying that the variance of the second sound feature is less than or equal to the threshold, generating the second PWM signal by mapping sound energy intensity of the second sub-sound data corresponding to the second sound feature with a duty cycle of the second PWM signal.

3. The method of claim 1, wherein the obtaining the first and the second sound features comprises:

extracting a plurality of sound features including the first sound feature, based on the first sub-sound data;

calculating a correlation between the plurality of sound features and a variance of the plurality of sound features; and selecting a representative sound feature, based on the correlation and the variance, wherein the representative sound feature is the first sound feature.

4. The method of claim 2, wherein the filtering the first sound feature comprises:

normalizing the first sub-sound data;

extracting, from the first sound feature, a section in which sound energy intensity is greater than an intensity threshold, and a section in which the sound energy intensity is not greater than the intensity threshold;

extracting, from the first sound feature, a section in which sound energy gradient is greater than a gradient threshold, and a section in which the sound energy gradient is not greater than the gradient threshold;

passing a section of the first sound feature in which both the sound energy intensity is greater than the intensity threshold and the sound energy gradient is greater than the gradient threshold; and attenuating (i) a section of the first sound feature in which either the sound energy intensity is not greater than the intensity threshold or the sound energy gradient is not greater than the gradient threshold, and (ii) a section of the first sound feature in which both the sound energy intensity is not greater than the intensity threshold and the sound energy gradient is not greater than the gradient threshold.

5. The method of claim 2, wherein the first sound feature comprises at least one of sound energy, a frequency, a pitch, or intensity.

6. The method of claim 1, further comprising transmitting the first PWM signal to a first actuator and transmitting the second PWM signal to a second actuator.

7. The method of claim 1, wherein the generating the plurality of PWM signals comprises:

obtaining user speech characteristics from user metadata; and adjusting at least one PWM signal among the plurality of PWM signals, based on the user speech characteristics.

8. The method of claim 1, wherein the generating the plurality of PWM signals comprises:

obtaining a user input; and adjusting the at least one PWM signal among the plurality of PWM signals, based on the user input.

9. The method of claim 1, wherein the neural network is a generator of generative adversarial network (GAN), and wherein the GAN is pre-trained by obtaining training source data that does not include at least one of the image data, the text data, or the sound data, generating, by using the generator, which receives the training source data as input, virtual data corresponding to at least one of the image data, the text data, or the sound data, which is not included in the training source data, determining, by using a discriminator that receives the virtual data and real data corresponding to the virtual data as input, whether the virtual data and the real data are real, and training the generator and the discriminator, based on a result of the determining.

10. A wearable device for providing a multi-modality, the wearable device comprising:

a display;

a speaker;

at least one actuator;

a memory storing one or more instructions; and at least one processor configured to execute the one or more instructions stored in the memory to obtain source data including at least one of image data, text data, or sound data, determine whether the image data, the text data, and the sound data are included in the source data, based on determining that at least one of the image data, the text data, or the sound data is not included in the source data, generate the image data, the text data, and the sound data, which are not included in the source data, by using a neural network, which receives the source data as input, generate a plurality of pulse-width modulation (PWM) signals, based on the sound data, and control the display, the speaker, and the at least one actuator to output the multi-modality based on the image data, the text data, the sound data, and the plurality of PWM signals, wherein the at least one processor is further configured to execute the one or more instructions to, in the generating of the plurality of PWM signals:
filter the sound data into first and second sub-sound data according to a frequency component of the sound data by using first and second filters that receive the sound data as input, wherein the first sub-sound data corresponds to the first filter and the second sub-sound data corresponds to the second filter;
obtain a first sound feature based on the first sub-sound data and a second sound feature based on the second sub-sound data;
identify whether each variance of the first and the second sound features are greater than a threshold; and
based on identifying whether each variance of the first and the second sound features is greater than the threshold, generate a first PWM signal corresponding to the first sub-sound data and a second PWM signal corresponding to the second sub-sound data.

11. The wearable device of claim 10, wherein the at least one processor is further configured to execute the one or more instructions to, in the generating of the plurality of PWM signals,
based on identifying that the variance of the first sound feature is greater than the threshold:
filter the first sound feature based on sound energy intensity of the first sub-sound data and a sound energy gradient of the first sub-sound data, and
generate the first PWM signal by mapping the sound energy intensity of the first sub-sound data corresponding to the filtered first sound feature with a duty cycle of the first PWM signal, and
based on identifying that the variance of the second sound feature is less than or equal to the threshold, generate the second PWM signal by mapping sound energy intensity of the second sub-sound data corresponding to the second sound feature with a duty cycle of the second PWM signal.

12. The wearable device of claim 10, wherein the at least one processor is further configured to execute the one or more instructions to, in the obtaining the first and the second sound features,
extract a plurality of sound features including the first sound feature, based on the first sub-sound data,
calculate a correlation between the plurality of sound features and a variance of the plurality of sound features, and
select a representative sound feature, based on the correlation and the variance,
wherein the representative sound feature is the first sound feature.

13. The wearable device of claim 11, wherein the at least one processor is further configured to execute the one or more instructions to, in the filtering the first sound feature,
normalize the first sub-sound data,
extract, from the first sound feature, a section in which sound energy intensity is greater than an intensity threshold, and a section in which the sound energy intensity is not greater than the intensity threshold,
extract, from the first sound feature, a section in which sound energy gradient is greater than a gradient threshold, and a section in which the sound energy gradient is not greater than the gradient threshold, and pass a section of the sound feature in which both the sound energy intensity is greater than the intensity threshold and the sound energy gradient is greater than the gradient threshold, and
attenuate (i) a section of the first sound feature in which either the sound energy intensity is not greater than the intensity threshold or the sound energy gradient is not greater than the gradient threshold, and (ii) a section of the first sound feature in which both the sound energy intensity is not greater than the intensity threshold and the sound energy gradient is not greater than the gradient threshold.

14. The wearable device of claim 11, wherein the first sound feature comprises at least one of sound energy, a frequency, a pitch, or intensity.

15. The wearable device of claim 10, wherein the at least one processor is further configured to execute the one or more instructions to, in the generating the plurality of PWM signals,
obtain user speech characteristics from user metadata, and
adjust at least one PWM signal among the plurality of PWM signals, based on the user speech characteristics.

16. The wearable device of claim 10, wherein the at least one processor is further configured to execute the one or more instructions to, in the generating the plurality of PWM signals,
obtain a user input, and
adjust at least one PWM signal among the plurality of PWM signals, based on the user input.

17. The wearable device of claim 10, wherein the neural network is a generator of generative adversarial network (GAN), and wherein the GAN is pre-trained by
obtaining training source data that does not include at least one of the image data, the text data, or the sound data,
generating, by using the generator, which receives the training source data as input, virtual data corresponding to at least one of the image data, the text data, or the sound data, which is not included in the training source data,
determining, by using a discriminator that receives the virtual data and real data corresponding to the virtual data as input, whether the virtual data and the real data are real, and
training the generator and the discriminator, based on a result of the determining.

18. A non-transitory computer-readable recording medium having recorded thereon a program for executing, on a computer, a method comprising:
obtaining source data including at least one of image data, text data, or sound data;
determining whether the image data, the text data, and the sound data are included in the source data;
based on determining that at least one of the image data, the text data, or the sound data is not included in the source data, generating the image data, the text data, and the sound data, which are not included in the source data, by using a neural network, which receives the source data as input;
generating a plurality of pulse-width modulation (PWM) signals, based on the sound data; and
outputting a multi-modality based on the image data, the text data, the sound data, and the plurality of PWM signals, wherein the generating the plurality of PWM signals comprises:
- filtering the sound data into first and second sub-sound data according to a frequency component of the sound data by using first and second filters that receive the sound data as input, wherein the first sub-sound data corresponds to the first filter and the second sub-sound data corresponds to the second filter;
- obtaining a first sound feature based on the first sub-sound data and a second sound feature based on the second sub-sound data;
- identifying whether each variance of the first and the second sound features are greater than a threshold; and
- based on identifying whether each variance of the first and the second sound features is greater than the threshold, generating a first PWM signal corresponding to the first sub-sound data and a second PWM signal corresponding to the second sub-sound data.

* * * * *